United States Patent
Ellis

(10) Patent No.: US 10,369,918 B2
(45) Date of Patent: Aug. 6, 2019

(54) TILT TRUCK AND RELATED METHOD OF TRANSPORTING TANK

(71) Applicant: Vertical Tank, Inc., Bakersfield, CA (US)

(72) Inventor: Travis Ellis, Bakersfield, CA (US)

(73) Assignee: Vertical Tank, Inc., Bakersfield, CA (US)

( * ) Notice: Subject to any disclaimer, the term of this patent is extended or adjusted under 35 U.S.C. 154(b) by 58 days.

(21) Appl. No.: 15/616,139

(22) Filed: Jun. 7, 2017

(65) Prior Publication Data
US 2018/0354399 A1 Dec. 13, 2018

(51) Int. Cl.
*B60P 1/64* (2006.01)

(52) U.S. Cl.
CPC ................ *B60P 1/6454* (2013.01)

(58) Field of Classification Search
CPC .. B60P 1/04; B60P 1/06; B60P 1/5438; B60P 1/283; B60P 1/30; B60P 1/32; B60P 1/483; B60P 1/52
See application file for complete search history.

(56) References Cited

U.S. PATENT DOCUMENTS

| | | | | |
|---|---|---|---|---|
| 2,606,676 A * | 8/1952 | Dempster | ................ | B60P 1/64 298/22 D |
| 3,606,249 A * | 9/1971 | Pewthers | ................ | B60P 1/30 254/423 |
| 4,626,166 A * | 12/1986 | Jolly | ................ | B60P 1/64 298/19 R |
| 5,674,046 A * | 10/1997 | Meyer | ................ | A01B 59/048 37/468 |
| 2009/0220325 A1* | 9/2009 | Berney | ................ | B60P 1/52 414/494 |
| 2010/0215466 A1* | 8/2010 | Cline | ................ | B60P 1/52 414/495 |
| 2013/0149084 A1* | 6/2013 | Jaeger | ................ | B60P 1/07 414/477 |
| 2014/0169920 A1* | 6/2014 | Herman | ................ | B60P 1/6427 414/483 |

* cited by examiner

*Primary Examiner* — Glenn F Myers
(74) *Attorney, Agent, or Firm* — Matthew C. McCartney; Eastman McCartney Dallmann LLP

(57) ABSTRACT

The present invention is a tilt truck and related method of transporting a vertical tank utilizing the tilt truck. The tilt truck includes a tractor truck with a tilt platform rotatably connected to a chassis of the tilt truck which can be raised to an angle of more than 90 degrees with respect to the tilt truck. The tilt platform includes a sliding arm assembly with at least one grappler hook sized to receive and secure a tank lifting bar of a vertical tank. The tilt truck, utilizing the tilt platform and sliding arm assembly is capable of lowering a vertical tank from a vertical position to a horizontal position ready for transport by a single operator located within a cab section of the tilt truck. Similarly, the tilt truck can also raise a vertical tank from a horizontal position to a vertical position.

18 Claims, 24 Drawing Sheets

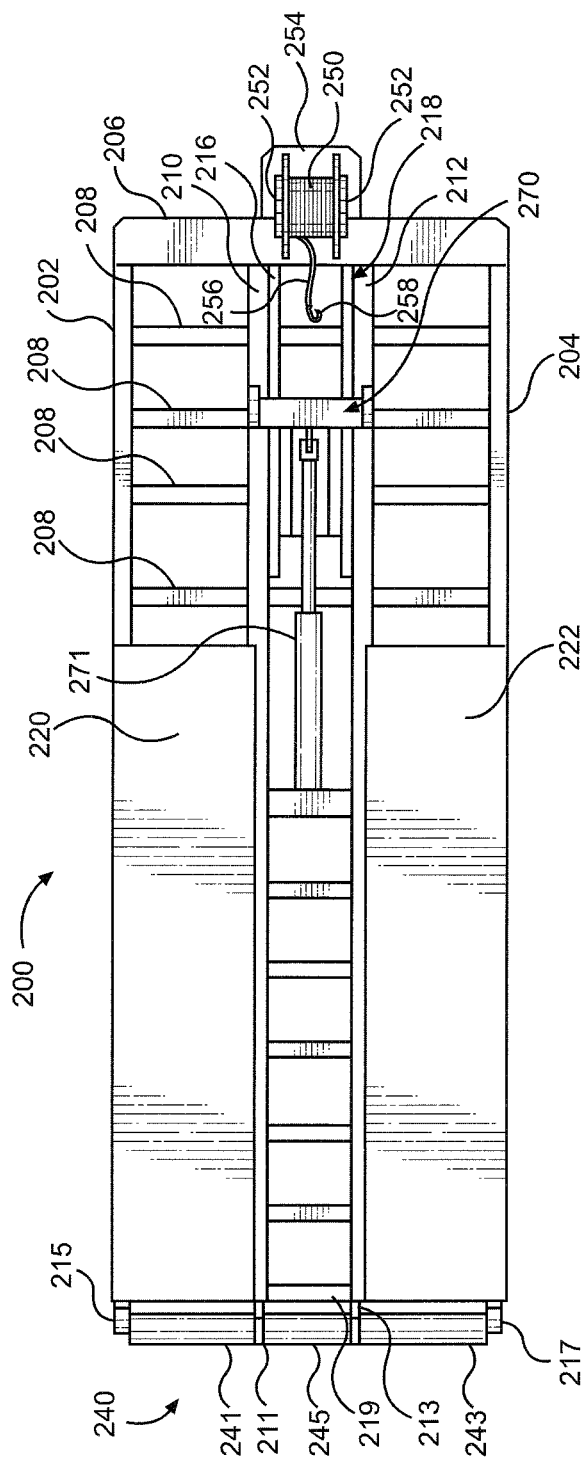
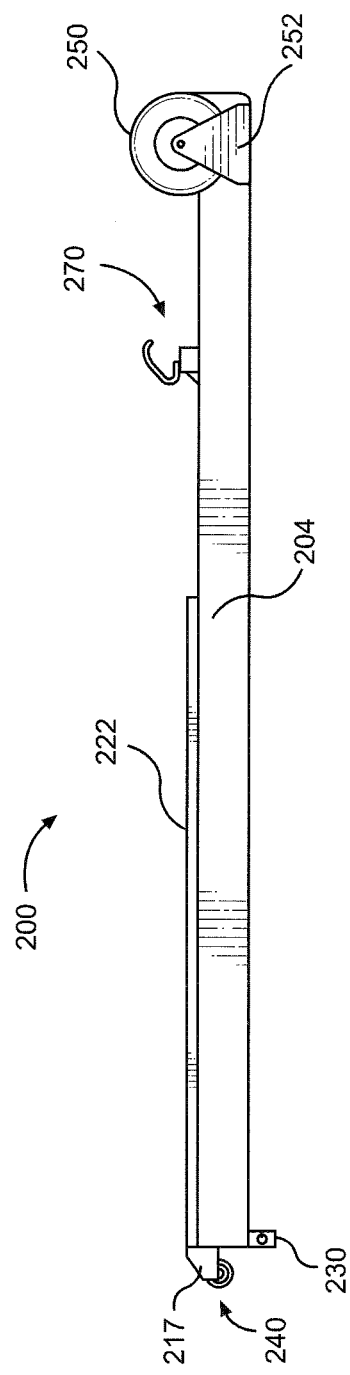
FIG. 4
FIG. 5

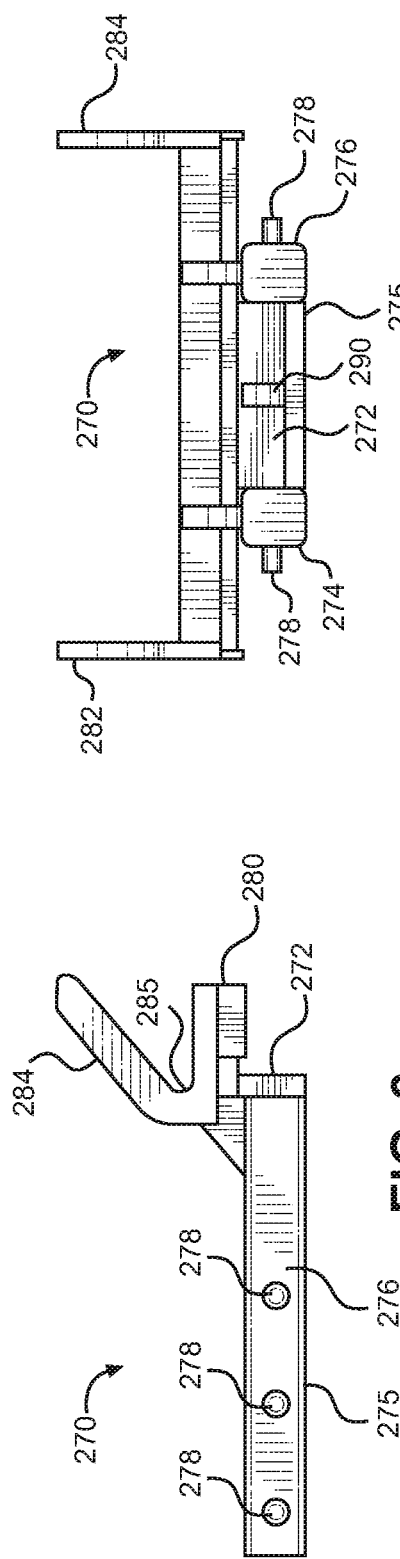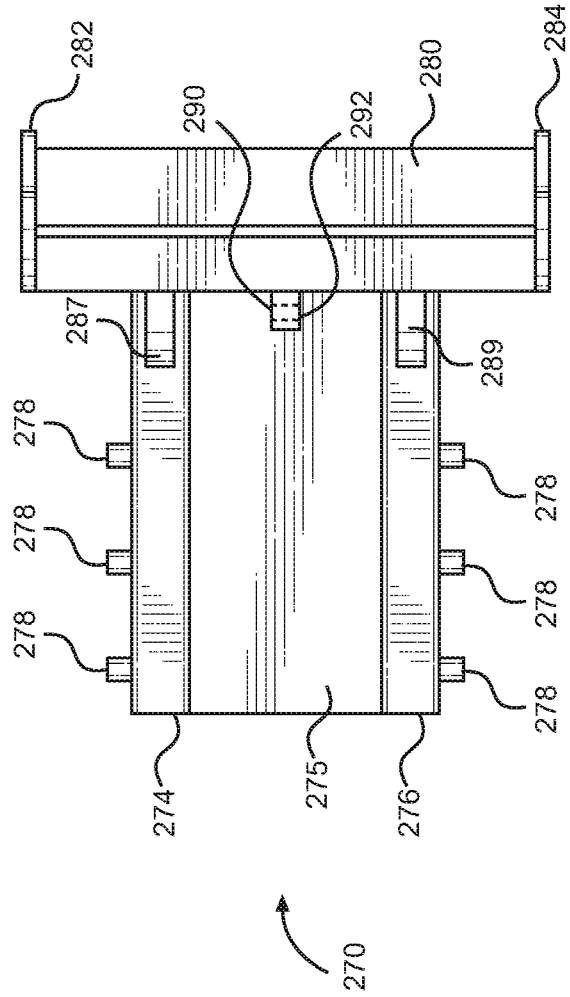

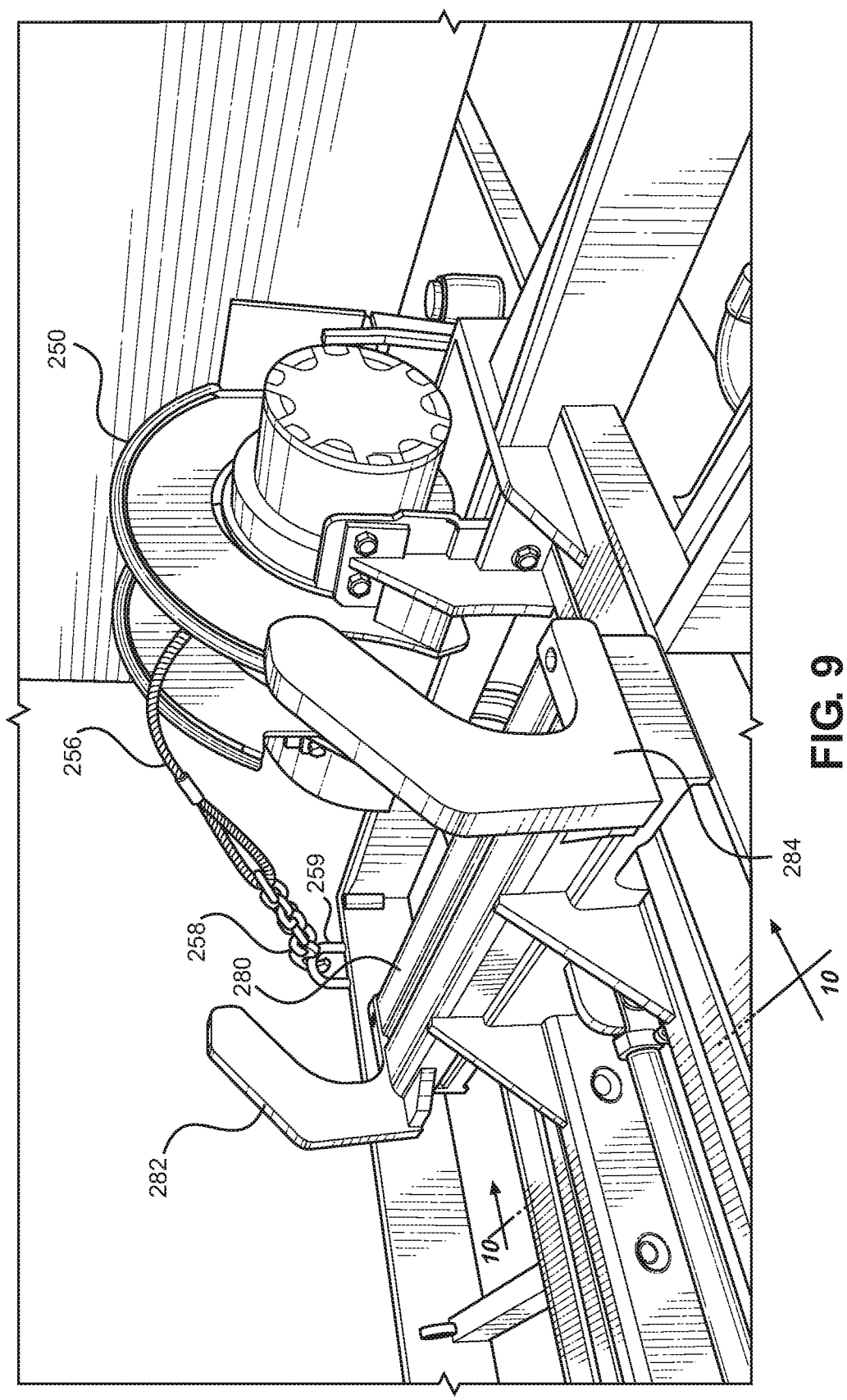

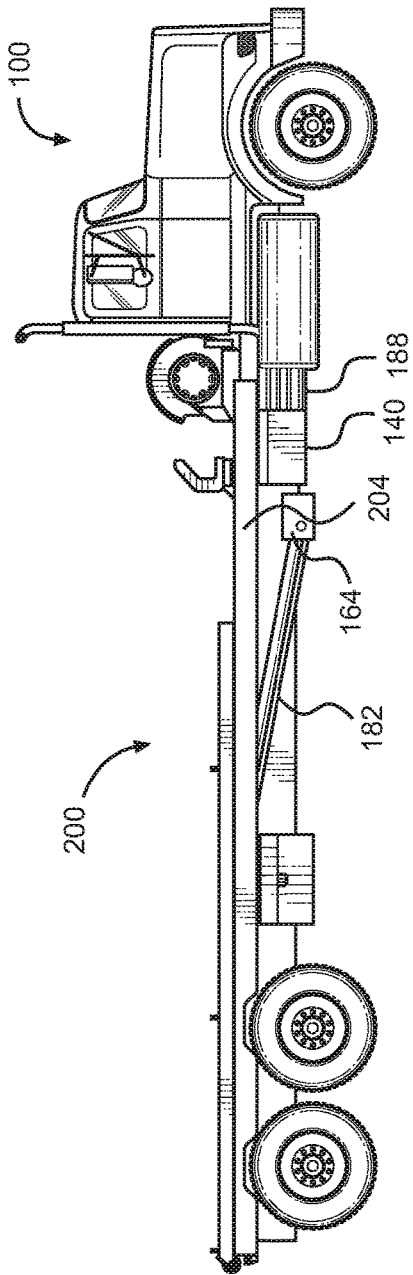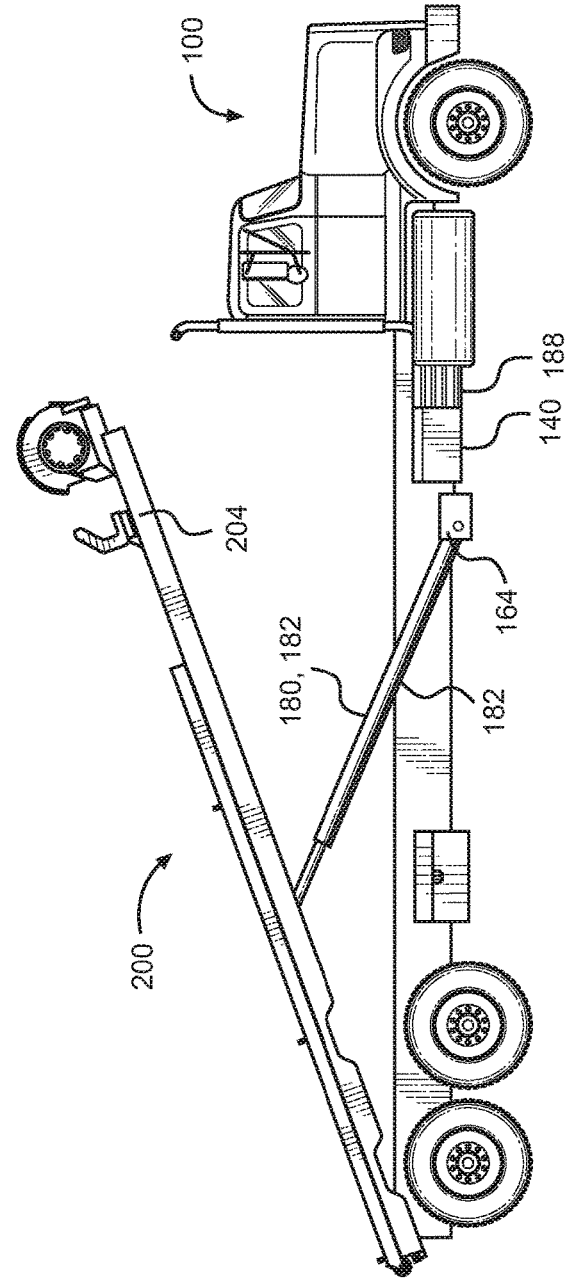

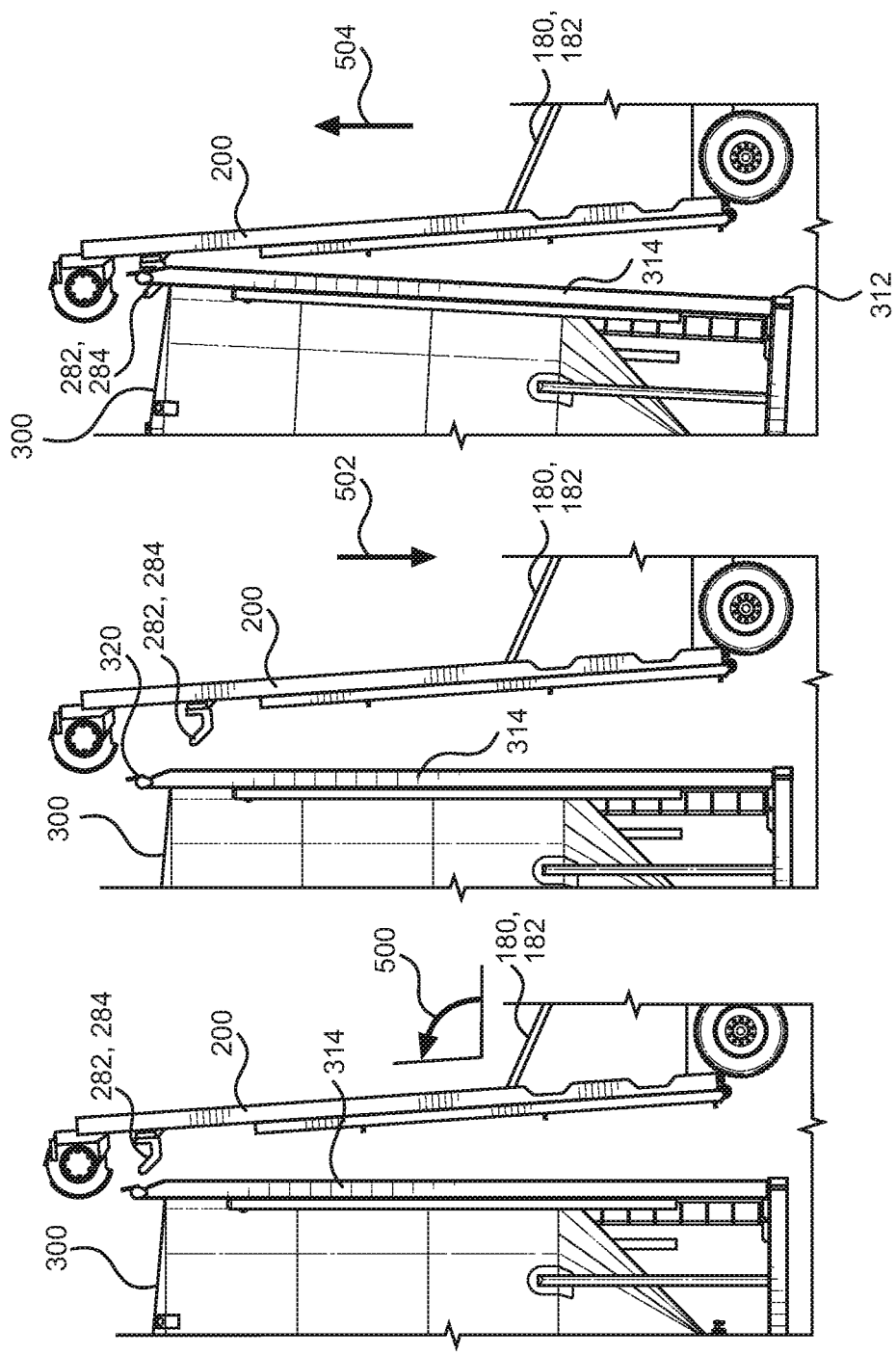

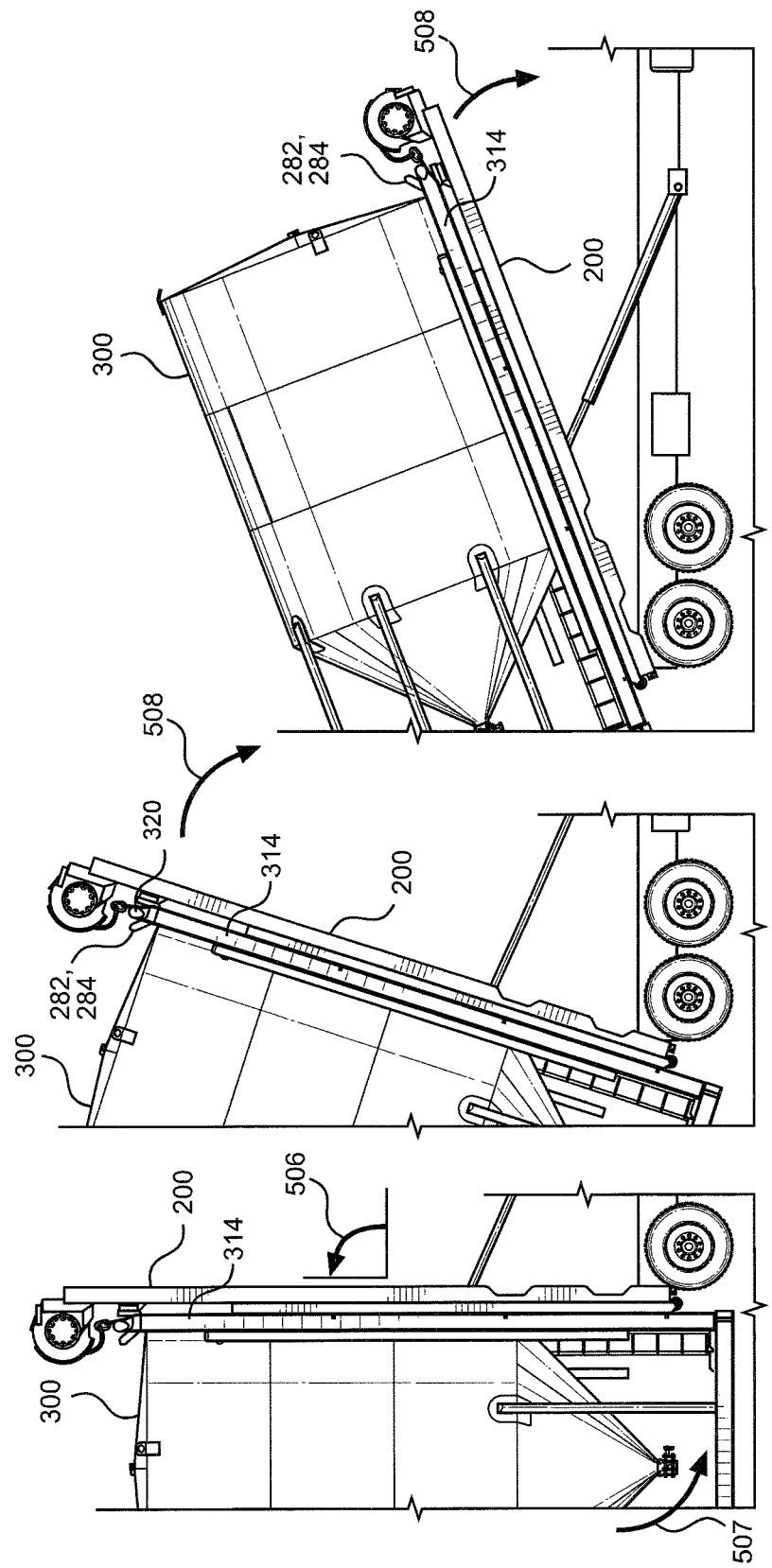

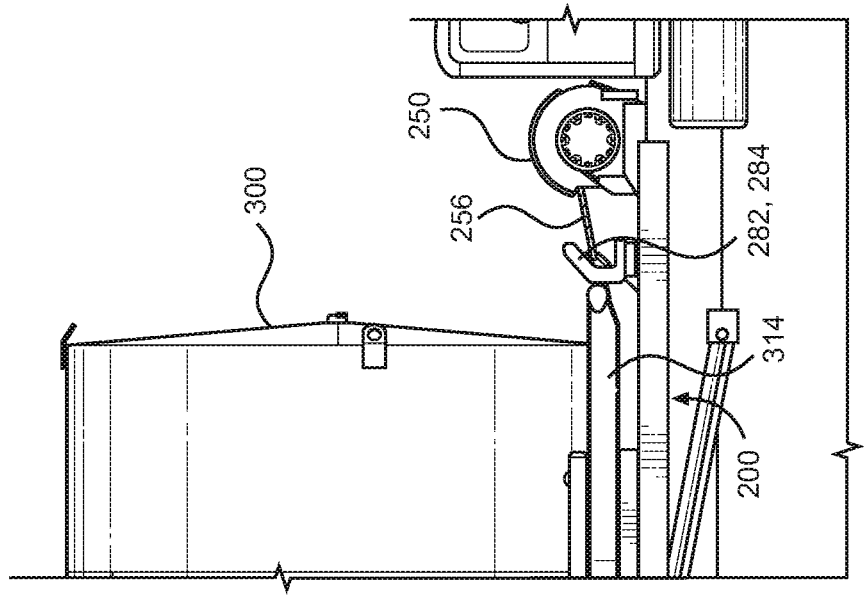
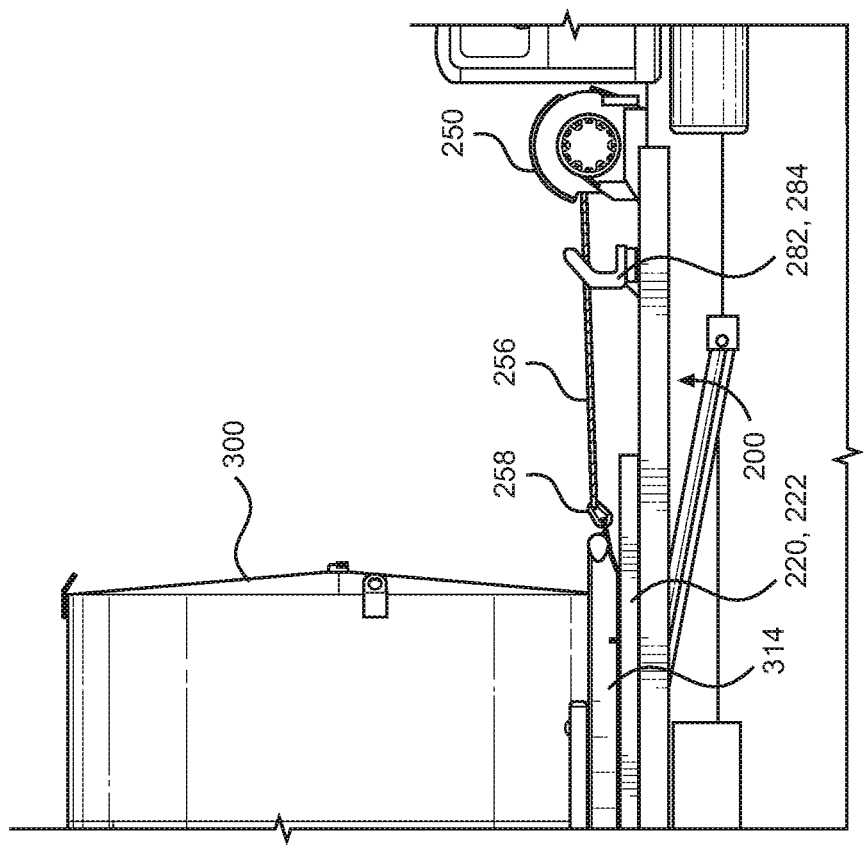

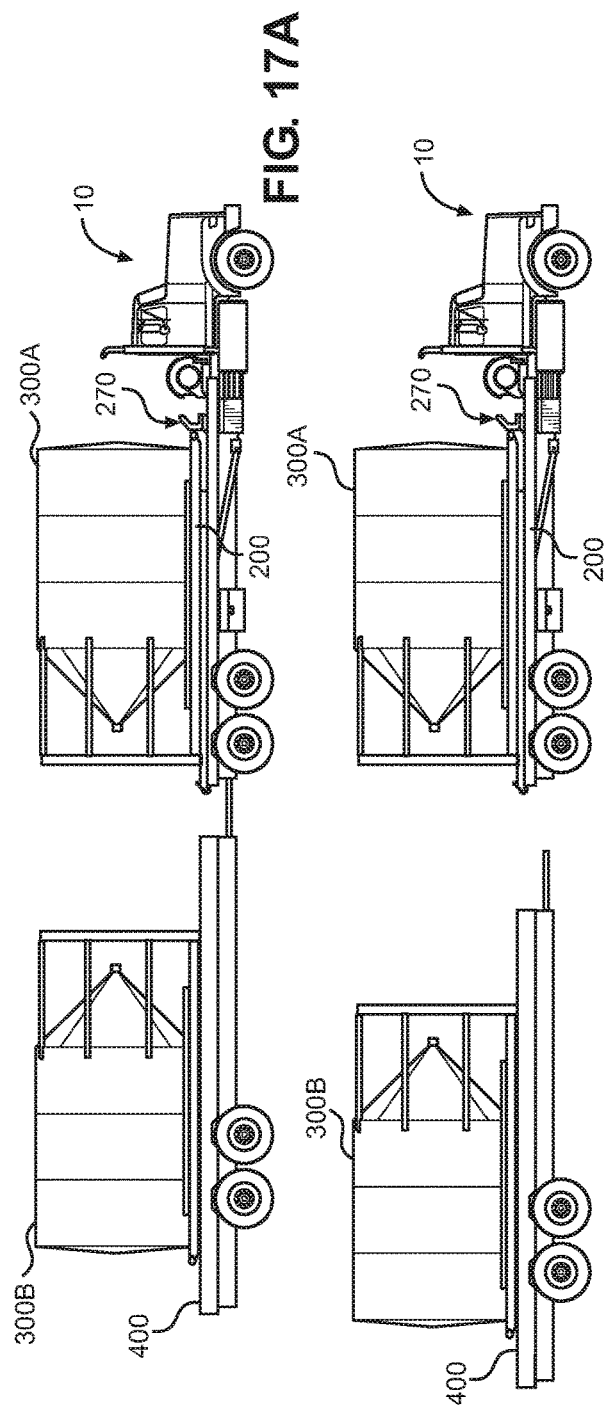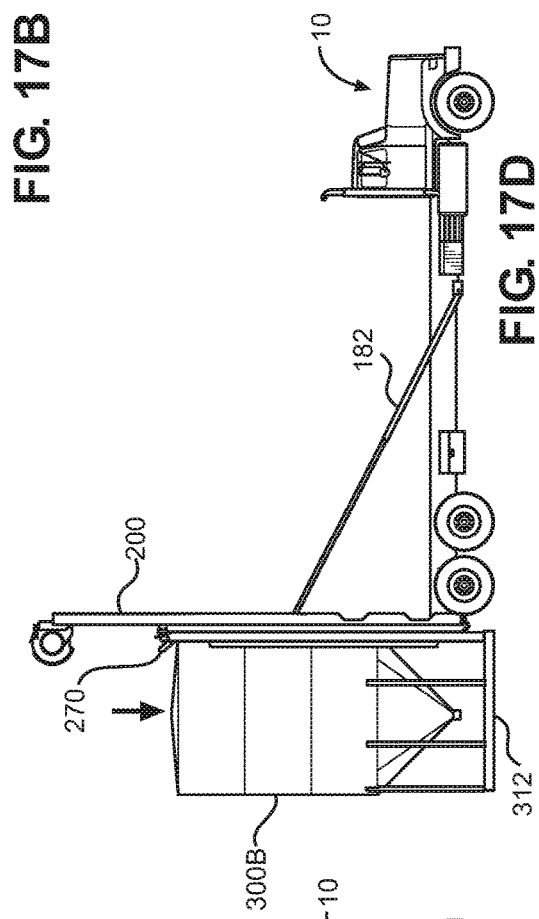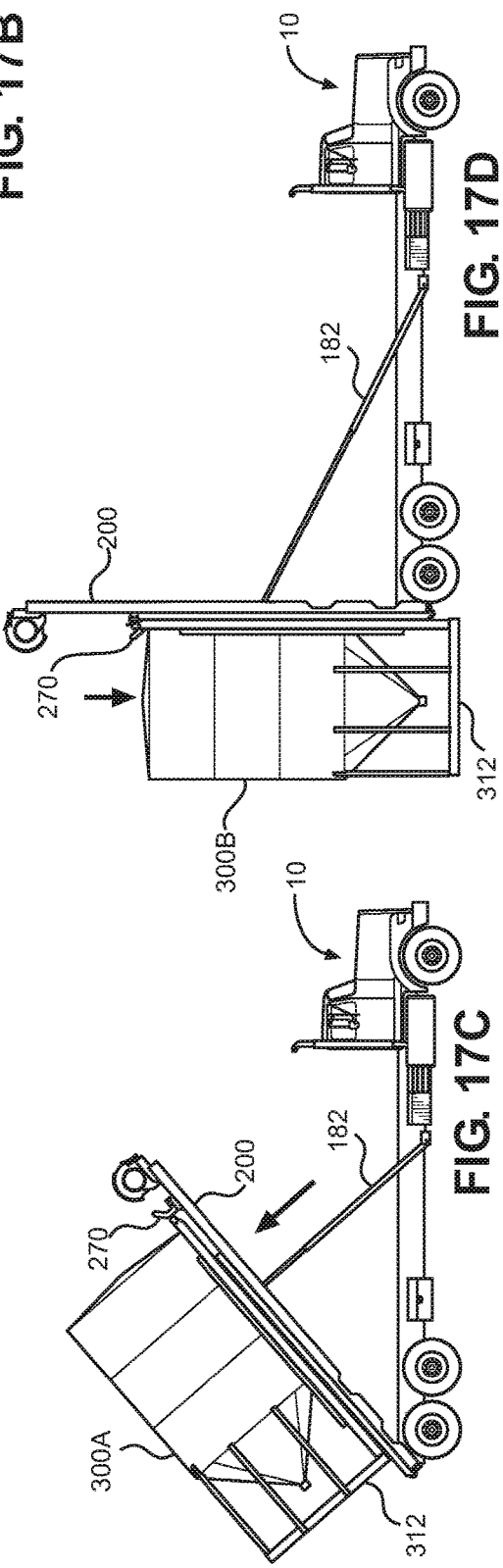

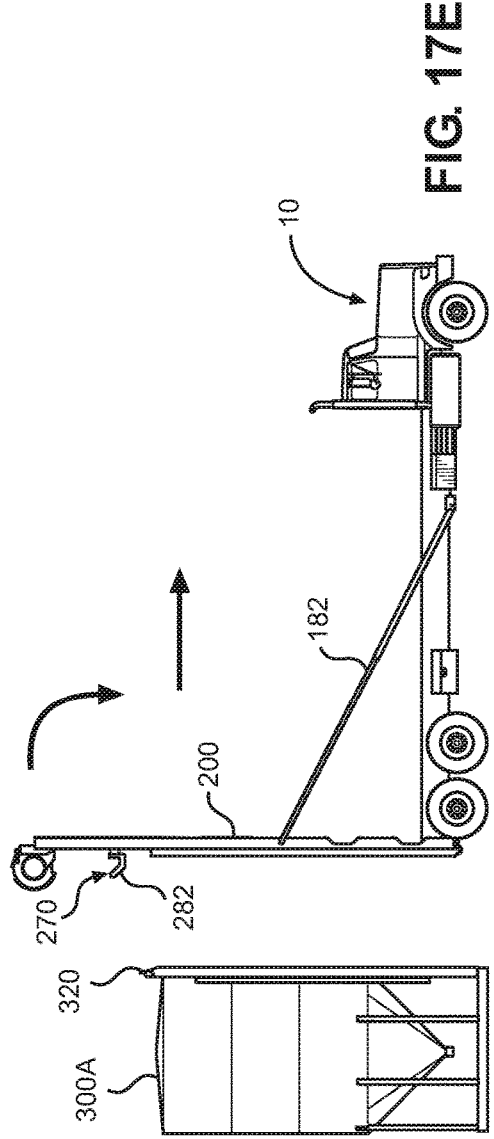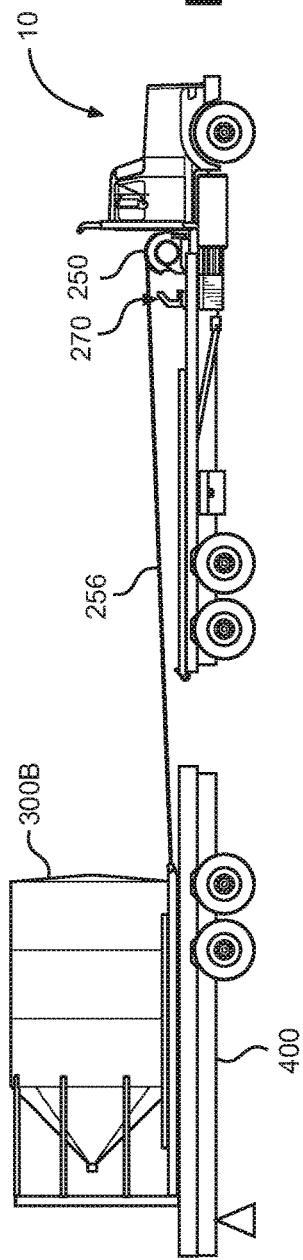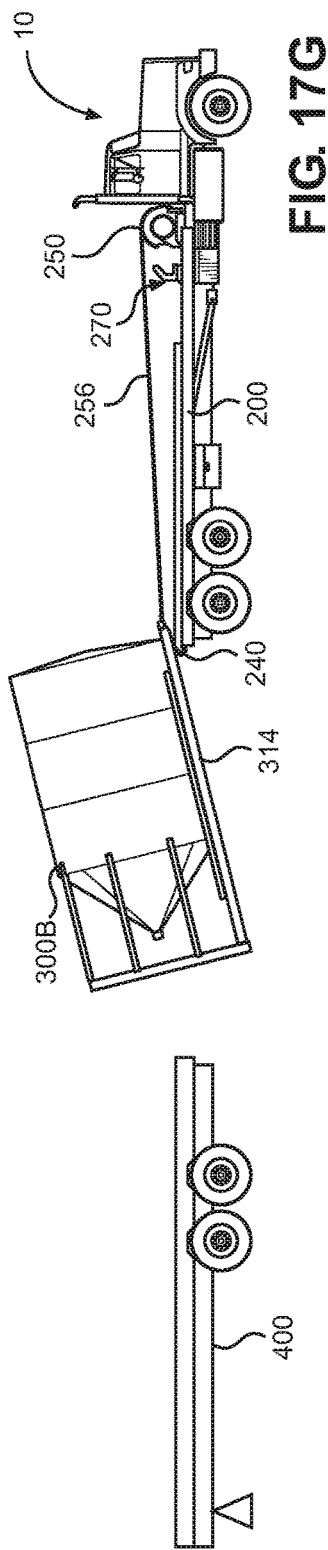

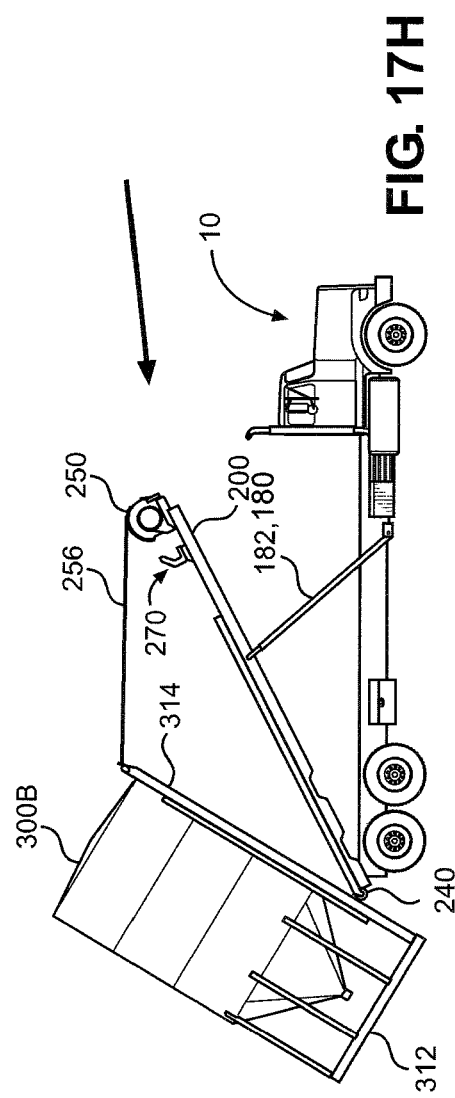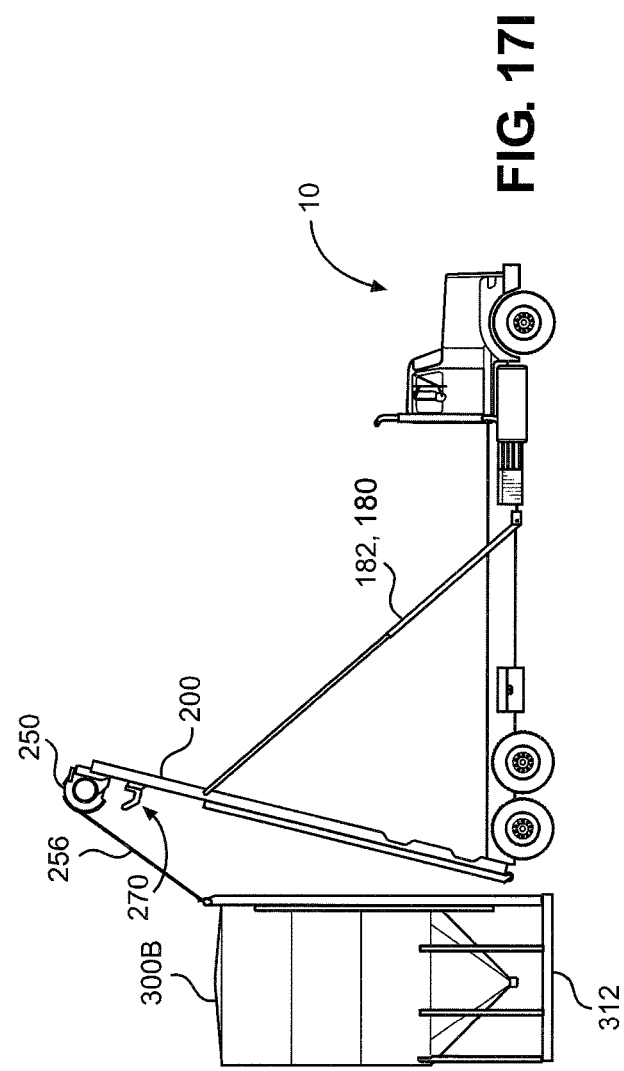

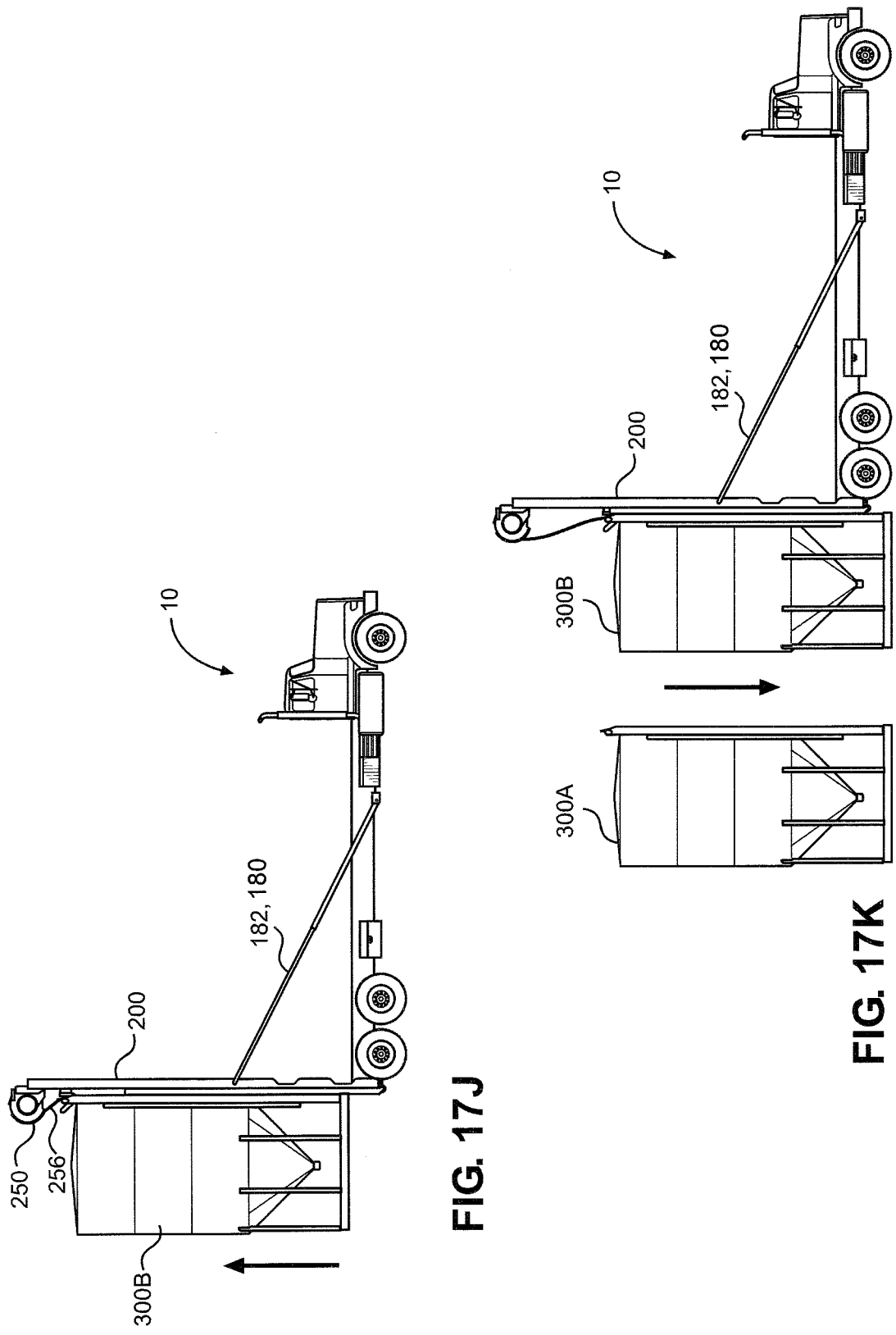

TILT TRUCK AND RELATED METHOD OF TRANSPORTING TANK

BACKGROUND OF THE INVENTION

The oil and gas industry regularly utilizes storage tanks for a variety of reasons, including drilling mud storage, process feed tanks, liquid separation and sludge storage. Such activities are carried out in remote locations such as an oil field or refinery. Also, such activities require the use of more than one storage tank to ensure proper capacity and/or to store different required materials.

Often, the need for these storage tanks is only temporary as particular activities, such as drilling an oil well, are performed. Once the activity requiring the use of a storage tank is completed, the need for the storage tank no longer exists at that location. Each such storage tank delivered then must be moved to a new location.

A variety of equipment rental companies exist that offer such storage tanks for rent. Many equipment rental companies only offer storage tanks that are generally in a horizontal configuration. However, some rental companies offer storage tanks that are generally in a vertical configuration, which occupies less ground surface area than an equivalent volume tank in a horizontal configuration. There are numerous advantages to using storage tanks in a vertical position, including the ability to offer cone bottom tanks which are easier to empty and to clean. Another advantage of vertically configured storage tanks include allowing for closer placement to the desired activity, such as to the drilling rig.

The drawback of using a vertically configured tank is that they cannot be transported in a vertical position. Therefore, they must be transported to the desired location in a horizontal configuration and then placed in a vertical configuration once at the project site. Conventional delivery systems contemplate a truck towing a trailer with the vertical tank stowed on the trailer in a horizontal position. In addition to the truck, a crane must accompany the truck to remove the tank from the trailer and also lift the tank from a horizontal position to a vertical position. The use of additional equipment, such as a crane adds to the transactional cost of delivering and retrieving the storage tanks. Moreover, the use of a crane requires the use of additional skilled labor, further adding to the transactional cost.

The more efficiently a rental company can deliver and set up storage tanks the more competitive a rental company can offer rental storage tank services. Thus, there is a need for a system of delivering vertically configured storage tanks that minimizes the equipment and labor necessary to deliver, move the tank from a horizontal position to a vertical position, and position the vertical storage tank in the proper position. There is a further need to be able to efficiently move a vertically configured storage tank whether in a vertical position or horizontal position.

SUMMARY OF THE INVENTION

The present invention is a tilt truck that enables a user to quickly load, unload, and transport a vertical tank with a single operator of the tilt truck. The tilt truck is a tractor truck equipped with a semi tractor truck having a cab portion and an elongated rear chassis portion. The rear chassis portion has a reinforced rear frame section designed to accommodate a rotating tilt platform connected to the reinforced rear frame at platform mounts connected to the rear frame.

The tilt truck has a hydraulic system that utilizes an auxiliary hydraulic reservoir in order to power left and right main hydraulic arms that rotate or tilt platform from a horizontal position to a slightly more than vertical position with respect to the tractor truck. The hydraulic system is fully controllable by an operator sitting in the cab section of the tractor truck and utilizing an interior hydraulic control panel.

The tilt platform has left and right platforms sized to slidably receive a sled frame of a vertical tank. Adjacent the front of the tilt platform is a winch system. Adjacent the rear of the tilt platform is a series of rollers.

A sliding arm assembly is slidably mounted to the tilt platform between the left and right platforms and the winch. The sliding arm assembly is in fluid communication with the hydraulic system of the tilt truck and is slidably moved within the tilt platform. The sliding arm assembly has left and right grappler hooks that are sized to catch and secure a tank lifting bar of a vertical tank. The left grappler hook and right grappler hook are sufficiently reinforced to bear the weight of a vertical tank suspended on the hooks at the tank lifting bar. The left grappler hook and right grappler hook each are curved to guide a tank lifting bar into a secure position on the left and right grappler hooks.

The tilt truck is designed to work most effectively with a vertical tank equipped with both a sled frame and a base frame, wherein the base frame supports the vertical tank when in a vertical position and the sled frame supports the vertical tank when in a horizontal position. Due to the size of the vertical tanks utilized in the oil and gas industry, they typically cannot be transported in a vertical position but instead must be lowered to a horizontal position. The preferred vertical tank for use in combination with the tilt truck has a tank lifting bar at the top of and transverse to the sled frame, opposite of the base frame.

In use, the operator of the tilt truck faces the rear of the tilt truck towards the sled frame of a vertical tank. The operator then utilizes the interior hydraulic control panel to raise the tilt platform to an engagement angle which is slightly more than 90 degrees with respect to the tractor truck. Then the operator reverses the tilt truck until the left grappler hook and right grappler hook are approximately below the tank lifting bar of the vertical tank. Next, the operator raises the sliding arm assembly until the left grappler hook and right grappler hook come into contact with the tank lifting bar. The operator then lifts the vertical tank utilizing the left grappler hook and the right grappler hook and lowers the tilt platform to a securing angle which is approximately 90 degrees with respect to the tractor truck. At the securing angle, the vertical tank rotates about the tank lifting bar on the left and right grappler hooks until the sled frame of the vertical tank comes into contact with the left and right platforms of the tilt platform. The operator simply then lowers the tilt platform to the rear chassis of the tractor truck, placing the vertical tank in a horizontal position and secured to the tilt truck by way of the left and right grappler hooks. The entire process of grapping, lowering and securing a vertical tank so that it is ready for transport is accomplished by a single operator from within the cab section of the vehicle. The method is easily reversible so as to enable the placement of a vertical tank directly in the field from a horizontal position on the tilt truck.

The rollers and winch provide flexibility to an operator of the tilt truck to also place a vertical tank onto the tilt platform from a horizontal position with the sled frame of the tank on the ground. Providing a lifting line panel on the tank lifting bar of the vertical tank facilitates the use of the winch and rollers to lift the vertical tank directly from a horizontal position to a horizontal position on the tilt platform of the tilt truck. The lifting line panel rotates with respect to the tank lifting bar and also distributes the load applied by the winch cable across the tank lifting bar.

The tilt truck is equipped with a hitch to enable the tilt truck to tow a trailer with a second vertical tank stored in a horizontal position. The winch can be used to drag the second vertical tank off the trailer such that the sled frame of the vertical tank rests on the ground. Once removed from the trailer, the second vertical tank can be lifted into a vertical position utilizing the rollers coupled with the winch and winch cable. More specifically, the winch cable is retracted by the winch until the tank lifting bar has passed over the rollers such that the rollers are in direct contact with the sled frame. Once in such contact, the tilt truck simply has to be reversed with the rollers rolling on the sled frame, pushing the tank to a vertical position. During this process, the operator must slacken the winch cable sufficiently to enable the tilt truck to push the tilt platform in combination with the winch and winch cable. More specifically, the tilt platform can be raised to a raising angle sufficient to lift the tank lifting bar.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 4 is a top view of the tilt platform with left platform mounted on a left platform frame and a left central frame and a right platform mounted on a right platform frame and a right central frame and having rollers mounted at the rear of the tilt platform and also showing the sliding arm assembly slidably connected between left and right slide rails running partially along the left and right central frame members;

FIG. 5 is a right side view of the tilt platform, showing a platform mounting bracket extending from the rear chassis support member directly beneath the right central frame member;

FIG. 6 is a right side view of the sliding arm assembly, showing the right grappler hook with a curved section sized to receive a transverse top frame of a tank;

FIG. 7 is a front view of the sliding arm assembly showing the left grappler hook and the right grappler hook connected opposite one another on a grappler transverse support;

FIG. 8 is a top view of the sliding arm assembly showing slide pins extending from left and right slide frames which are mounted on either side of a front side frame, all of which are connected to a base plate;

FIG. 9 is an isometric view of the sliding arm assembly slidably secured within the left and right slide rails of the tilt platform;

FIG. 11a is a right side view of the tilt truck with the tilt platform in the down position securely resting on the rear chassis frame section of the tractor truck;

FIG. 11b is a right side view of the tilt truck showing the tilt platform rotating about the connection point of the platform mount brackets of the tilt platform to the platform mount tabs of the tractor truck;

FIG. 14a is a right side view of the tilt truck approaching a vertical tank and having the tilt platform at a tank grabbing angle with respect to the tractor truck;

FIG. 14b is a right side view of the tilt truck with the sliding assembly sliding in a down direction such that the grapplers are lower than the transverse top frame of the vertical tank;

FIG. 14c is a right side view of the tilt truck reversed with respect to the vertical tank such that the grapplers are located directly underneath the transverse top frame of the vertical tank and raised up towards the transverse top frame of the vertical tank;

FIG. 14d is a right side view of the tilt truck with the grapplers lifting the vertical tank by the transverse top frame such that base frame of the vertical tank is above the ground allowing the vertical tank to rotate about the point of contact between the grapplers and the transverse top frame until the sled frame of the vertical tank securely rests against the left and right platforms of the tilt platform;

FIG. 14e is a right side view of the tilt truck showing the tilt platform being lowered toward the down position;

FIG. 14f is a right side view of the tilt truck showing the tilt platform further lowered toward the down position with the vertical tank held securely to the platform by the grapplers;

FIG. 15e is an isometric view of the tilt truck with the sled frame of the vertical tank in contact with the left and right platforms of the tilt truck;

FIG. 15f is an isometric view of the tilt truck with the tank securely resting on the left and right platforms of the tilt truck, held in place by the retracted winch cable and ready for transport;

FIG. 17a is a side view of the tilt truck with an attached trailer with a first vertical tank stored on the tilt platform and a second vertical tank stored on the trailer;

FIG. 17b is a side view of the tilt truck disconnected from the trailer to enable the tilt truck to position the first vertical tank in place;

FIG. 17c is a side view of the tilt truck raising the tilt platform to position the first vertical tank in place;

FIG. 17d is a side view of the tilt truck with the tilt platform approximately 90 degrees with respect to the tractor truck and showing the lowering of the sliding arm assembly to lower the first vertical tank to the ground in a vertical position with its base frame on the ground;

FIG. 17e is a side view of the tilt truck with the sliding arm assembly sufficiently lowered to the tilt truck to move away from the first vertical tank positioned in a vertical position;

FIG. 17f is a side view of the tilt truck with the tilt platform lowered and the tilt truck reversed to the trailer with the winch cable connected to the tank cable of the second vertical tank;

FIG. 17g is a side view of the winch dragging the second tank off the trailer and onto the tilt platform such that the sled frame of the second vertical tank is in contact with the rollers of the tilt truck;

FIG. 17h is a side view of the tilt truck reversing towards the second vertical tank and simultaneously raising the tilt platform to enable the second vertical tank to be rotated toward a vertical position with the rate of rotation controlled by the winch and winch cable;

FIG. 17i is a side view of the of the tilt truck placing the second vertical tank in a vertical position;

FIG. 17j is a side view of the tilt truck raising the second vertical tank off the ground while in a vertical position through use of the winch cable to facilitate the precise placement of the second vertical tank through use of the tilt truck;

FIG. 17k is a side view of the tilt truck placing the second vertical tank in a vertical position adjacent the first vertical tank thereby creating a tank array.

DETAILED DESCRIPTION OF THE INVENTION

Figure 1:
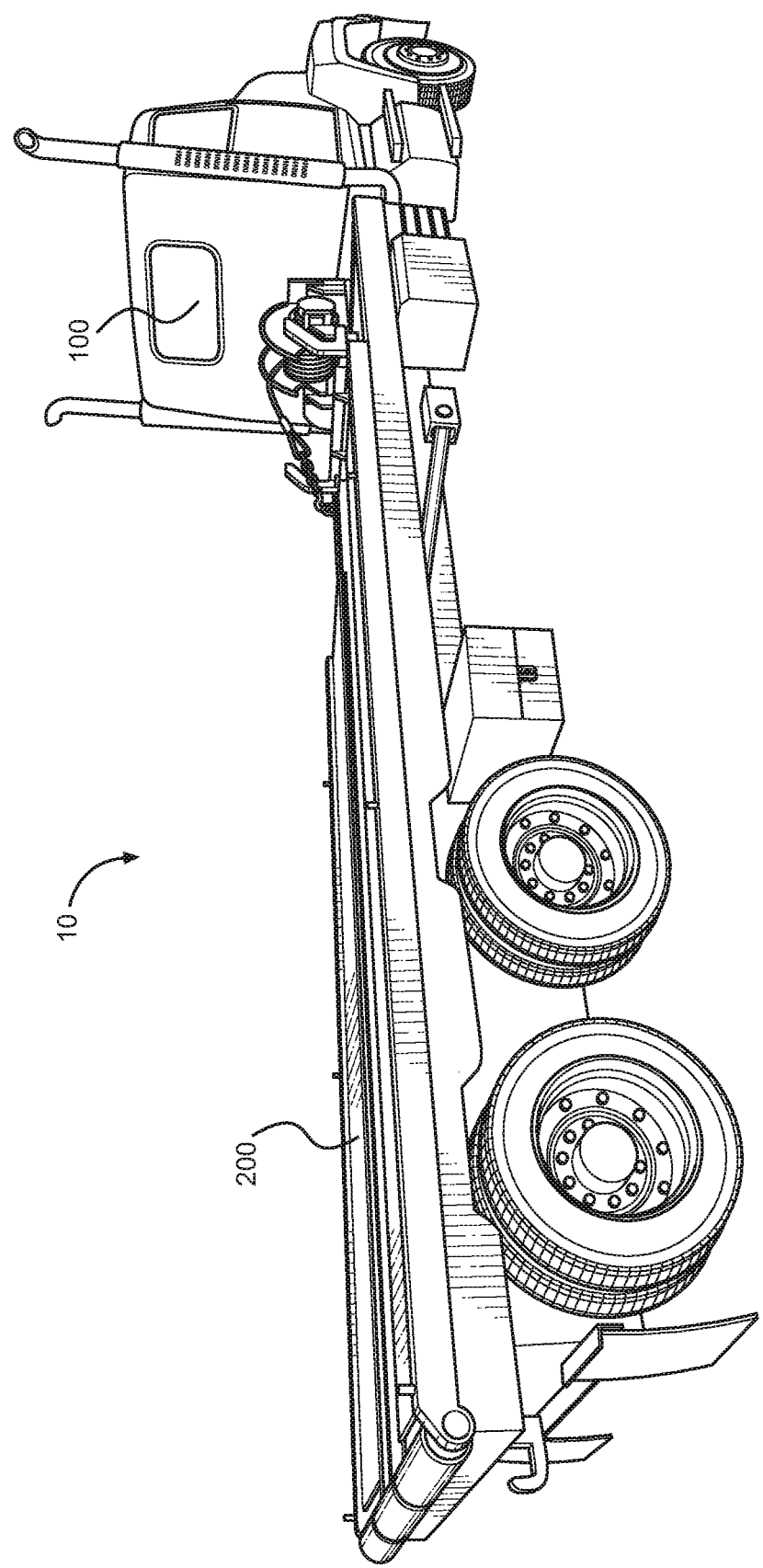
FIG. 1 is a rear perspective view of a tilt truck having a tilt platform rotatably connected to a rear chassis frame section of a tractor truck.

Referring initially to FIG. 1, a tilt truck 10 is generally disclosed and includes a tractor truck 100 with a tilt platform 200 rotatably connected to the tractor truck 100. The tilt truck 10 is shown with the tilt platform 200 in the down position.

Figure 2:
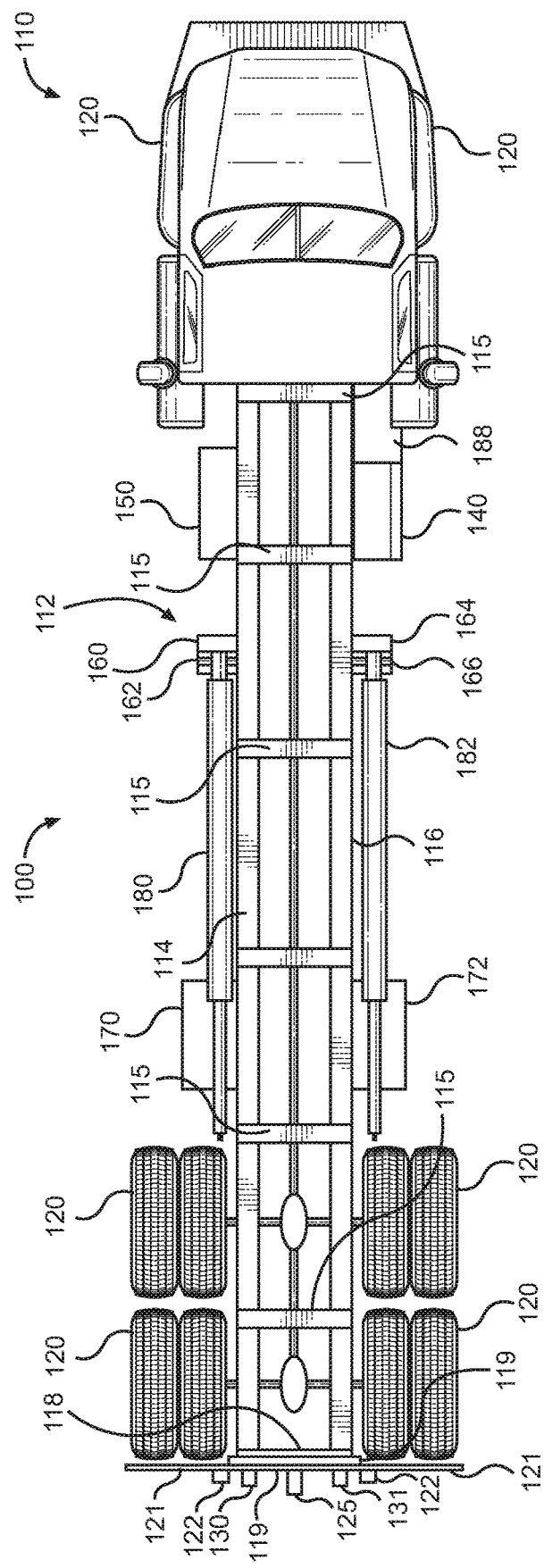
FIG. 2 is a top view of the tractor truck, showing the rear chassis frame section with an exterior control panel and an auxiliary hydraulic reservoir connected to a left chassis frame and right chassis frame respectively with a rear chassis frame connected therebetween.
Figure 3:
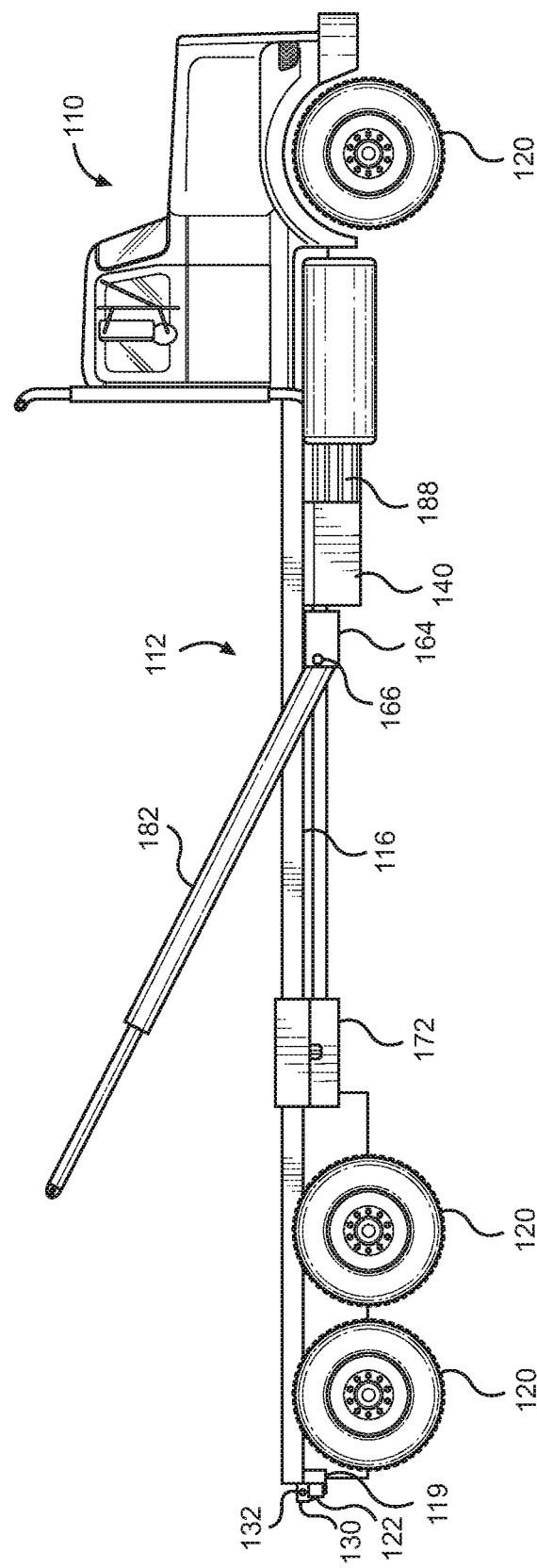
FIG. 3 is a right side view of the tractor truck, showing the right main hydraulic arm bracket with through hole and a platform mount tab extending from a rear chassis support member connected to and reinforcing the rear chassis frame.

Referring next to FIGS. 2 and 3, the tractor truck 100 has a cab section 110 and a rear chassis frame section 112. The tractor truck 100 is shown with wheels 120 in a dual rear axle configuration with four wheels 120 per axle. The number of axles and wheels shown is not meant to be limiting, but rather illustrative of a typical configuration of a tractor truck 100.

The rear chassis frame section 112 comprises a left chassis frame 114 and a right chassis frame 116 separated from one another and secured together by a plurality of transverse chassis support members 115 and a rear chassis frame 118.

The rear chassis frame 118 is reinforced with a rear chassis support member 119 that extends beneath and beyond the rear chassis frame 118, left chassis frame 114 and right chassis frame 116. Mud flaps 121 and rear stop lamps 122 are mounted to each end of the rear chassis support member 119. The tilt truck 10 is also equipped with a hitch 125 connected to the rear chassis support member 119 of the rear chassis frame 118.

A left platform mount tab 130 is connected to the rear chassis frame 118 and the rear chassis support member 119 and adjacent to the end of the left chassis frame 114. Similarly, a right platform mount tab 131 is connected to the rear chassis frame 118 and the rear chassis support member 119 and adjacent to the end of the right chassis frame 116. The left platform mount tab 130 and the right platform mount tab 131 each have a mount tab through hole 132. The left platform mount tab 130 and the right platform mount tab 131 serve as a point of connection between the tilt platform 200 (shown in FIG. 1) and the tractor truck 100 that enables the tilt platform 200 to rotate about the mount tabs 130 and 131 as set forth in more detail below.

The tilt truck 100 is also equipped with an auxiliary hydraulic reservoir 140. As shown in FIGS. 2 and 3, the auxiliary hydraulic reservoir 140 is attached to the right chassis frame 116 opposite an exterior hydraulic control panel 150 which is mounted to the left chassis frame of the truck 100. The purpose of the exterior hydraulic control panel 150 is to enable an operator of the tilt truck 10 invention to operate the various hydraulic components of the invention as set forth herein. The purpose of the auxiliary hydraulic reservoir 140 is to increase the capacity of hydraulic fluid of the tilt truck 10 to ensure sufficient hydraulic fluid is available to maximize the efficient operation of the hydraulic components of the tilt truck 10. Adjacent to and integrated with the auxiliary hydraulic reservoir 140 is an oil cooler 188 to provide cooling to the hydraulic system.

A left main hydraulic arm bracket 160 is connected to and extends below the left chassis frame 114 and has a left main hydraulic arm through hole 162. Similarly, a right main hydraulic arm bracket 164 is connected to and extends below the right chassis frame 116 and has a right main hydraulic arm through hole 166. The left main hydraulic arm bracket 160 and the right main hydraulic arm bracket 164 are sized to receive a left main hydraulic arm 180 (shown in FIGS. 11*b*-11*c*) and a right main hydraulic arm 182 (shown in FIGS. 11*b*-11*c*) respectively.

The tractor truck 100 of the tilt truck 10 also includes a left storage container 170 connected to the left chassis frame 114 and a right storage container 172 connected to the right chassis frame 116. The left and right storage containers 170 and 172 are sized to securely store a variety of tools to be used in combination with the tilt truck 10 invention.

Referring next to FIGS. 4 and 5, the tilt platform 200 has a left platform frame 202 and a right platform frame 204, which are connected by a front platform frame 206, a plurality of transverse support members 208 and a rear platform frame 219. The tilt platform is further reinforced by a left central frame 210 and a right central frame 212, each of which is connected to and extends between the front platform frame 206 and the rear platform frame 219. Extending beneath the rear platform frame 219 are platform mounting brackets 230.

A left platform 220 is mounted onto the top of the left platform frame 202 and the left central frame 210. Similarly, a right platform 222 is mounted onto the top of the right platform frame 204 and the right central frame 212. Both the left platform 220 and the right platform 222 are sized to slidably receive and support sled frame members 314 (shown in FIG. 13) of a vertical tank 300 (shown in FIG. 13).

The front platform frame 206 has a winch 250 set on a winch frame 252, which in turn is connected to a winch platform 254 such that the winch 250 is centered with the front platform 206. The winch platform 254 is connected to the front platform frame 206 and ensures that the winch 250 is raised slightly above the height of the left and right platforms 220 and 222. The winch 250 has a winch cable 256 which is wound about the winch 250 and terminates in a winch hook 258 (shown in FIG. 9).

A left slotted frame 216 is connected to the left central frame 210 and extends partially along the left central frame 210 and terminates at the front platform frame 206. Similarly, a right slotted frame 218 is connected to the right central frame 212 and extends partially along the right central frame 212 and terminates at the front platform frame 206. A sliding arm assembly 270 is sized to slidably fit within and between the left slotted frame 216 and the right slotted frame 218 such that the sliding arm assembly can slide relative to the tilt platform 200 within the left slotted frame 216 and the right slotted frame 218. The sliding arm assembly 270 is connected to a sliding hydraulic arm 271, which in turn is connected to a transverse support member 208 of the tilt platform 200.

A left roller frame 215 is connected to the rear platform frame 219 adjacent the left platform frame 202. Similarly, a right roller frame 217 is connected to the rear platform frame 219 adjacent the right platform frame 204. A roller 240 is connected between the left roller frame 215 and right roller frame 217 and is capable of rotation with respect to the left roller frame 215 and the right roller frame 217. In one embodiment of the present invention, the roller 240 can be divided into a left roller 241, a right roller 243 and a middle roller 245. In this embodiment, the left roller 241 is disposed between the left roller frame 215 and a left central roller frame 211, which is connected to and extending from the left central frame 210. Similarly, the right roller 243 is disposed between the right roller frame 217 and a right central roller frame 213, which is connected to and extending away from the right central frame 212. The middle roller 245 is disposed between the left central roller frame 211 and the right central roller frame 213. The purpose of the roller 240 is to facilitate the movement of a vertical tank 300 on and off the tilt platform 200.

Turning to FIGS. 6-8, the sliding arm assembly 270 is generally shown. The sliding arm assembly has a front slide frame 272 transversely connected to a left slide frame 274 and a right slide frame 276. A base plate 275 is connected adjacent the bottom of the front slide frame 272, the left slide frame 274 and the right slide frame 276. A plurality of slide pins 278 are connected transversely and extend away from the left slide frame 274 and right slide frame 276. A grappler arm transverse support 280 is mounted on top of the front slide frame 272. A left grappler hook 282 is connected to the left side of the grappler arm transverse support 280 and opposite a right grappler arm 284 connected to the right side of the grappler arm transverse support 280. The left grappler hook 282 and right grappler hook 284 each has a curved surface sized to guide and secure a tank lifting bar 320 of a vertical tank 300 as set forth more fully below.

The front slide frame 272 and grappler arm transverse support 280 are reinforced by a left reinforcement member 287 and a right reinforcement member 289. A hydraulic slide mount tab 290 is transversely connected to the front slide frame 272 and the top of the base plate 275. A hydraulic slide mount tab through hole 292 is set within the hydraulic slide mount tab 290 and sized to receive a fastener (not shown) in order to connect the sliding hydraulic arm 271 of the tilt platform 200.

Figure 10:
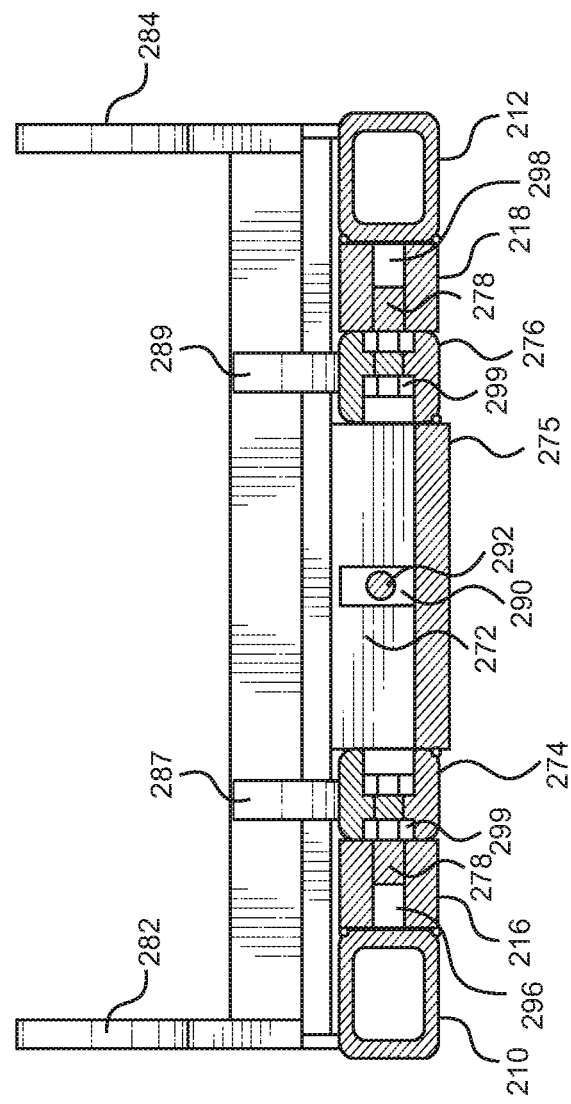
FIG. 10 is a cross-sectional view of the sliding arm assembly along the lines 10-10 of FIG. 9 and showing the slide pins within the left and right slide rails, which in turn are shown welded to the left and right central frame members of the tilt platform.

Turning to FIGS. 9 and 10, the sliding arm assembly 270 is shown slidably connected to the tilt platform 200. The left slide frame 274 and right slide frame 276 are separated from one another by the base plate 275 and front slide frame 272 such that the left slide frame 274 is adjacent the left slotted frame 216 of the tilt platform 200 and the right slide frame 276 is adjacent the right slotted frame 218 of the tilt platform 200. Slide pins 278 extend from the left slide frame 274 and into a left slot 296 of the left slotted frame 216. Similarly, slide pins 278 extend from the right slide frame 276 and into a right slot 298 of the right slotted frame 218. Slide pins 278 are locked into the left slide frame 274 and right slide frame 276 by way of slide pin fasters 299.

Winch 250, along with winch cable 256 and winch hook 258 are centered on the platform 200 such that the winch cable 256 and winch hook 258 are able to pass between left grappler hook 282 and right grappler hook 284 when in use. When not in use, the winch hook 258 is stored on a winch eye 259, which in turn is connected to frame 202. Such storage ensures that the winch cable 256 will not interfere with operation of the sliding arm assembly 270.

Figure 11C:
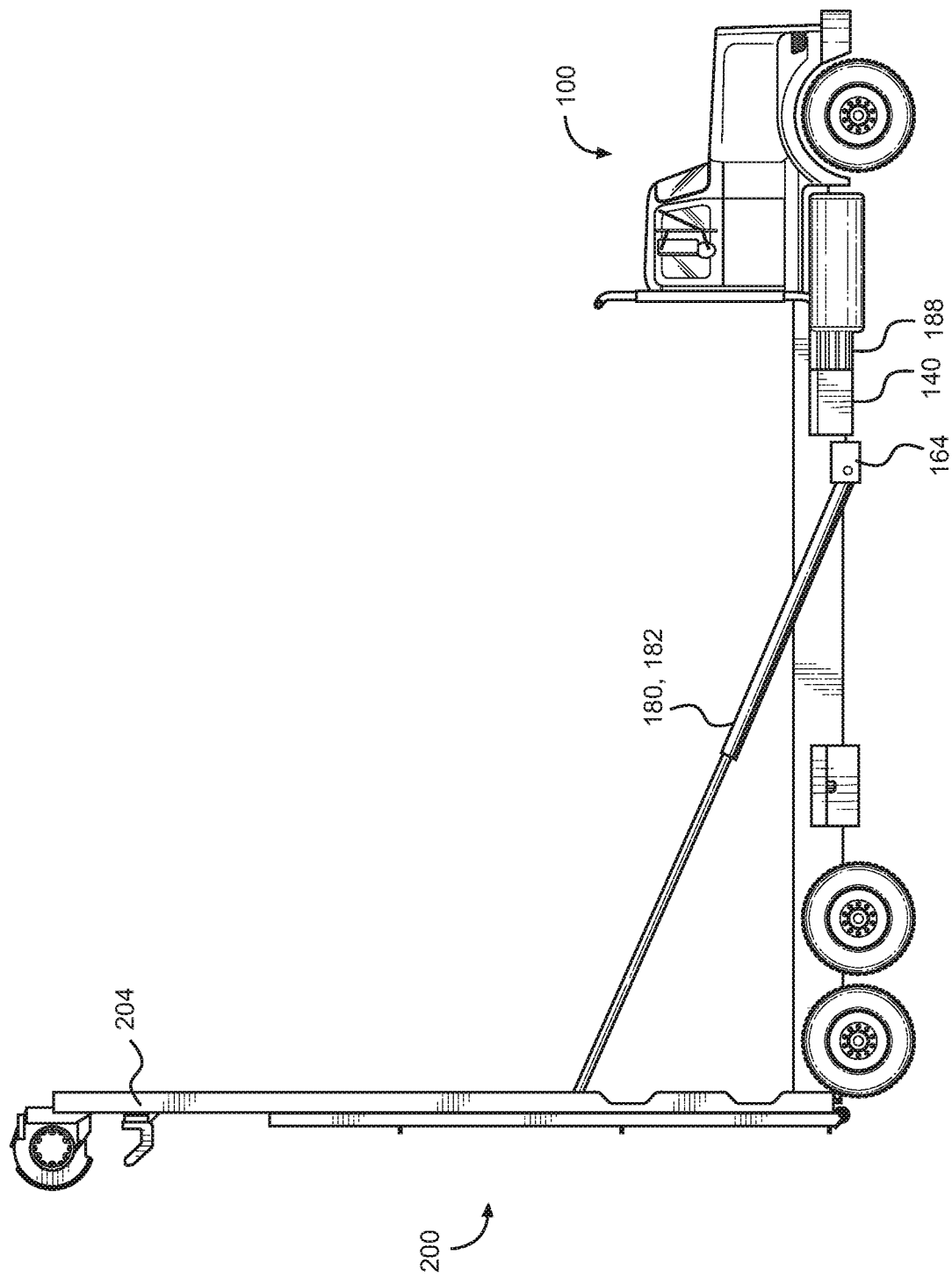
FIG. 11c is a right side view of the tilt truck showing the tilt platform in the up position and ready to retrieve a vertical tank.

Turning to FIGS. 11*a* through 11*c*, the tilt platform 200 is shown connected to the tractor truck 100. In FIG. 11*a*, the tilt platform 200 is shown in a horizontal position, resting securely on the left and right platform frames 202 and 204. An operator utilizes either the exterior control panel 150 (not shown) or interior hydraulic control panel 152 (not shown) to engage the left main hydraulic arm 180 and the right main hydraulic arm 182. The left main hydraulic arm 180 and the right main hydraulic arm 182 are in fluid communication with the auxiliary hydraulic reservoir 140 thereby ensuring that the left main hydraulic arm 180 and the right main hydraulic arm 182 each has sufficient hydraulic fluid to raise the tilt platform 200 from the horizontal position, as shown in FIG. 11*a*, to a substantially vertical position as shown in FIG. 11*c*.

Figure 12:
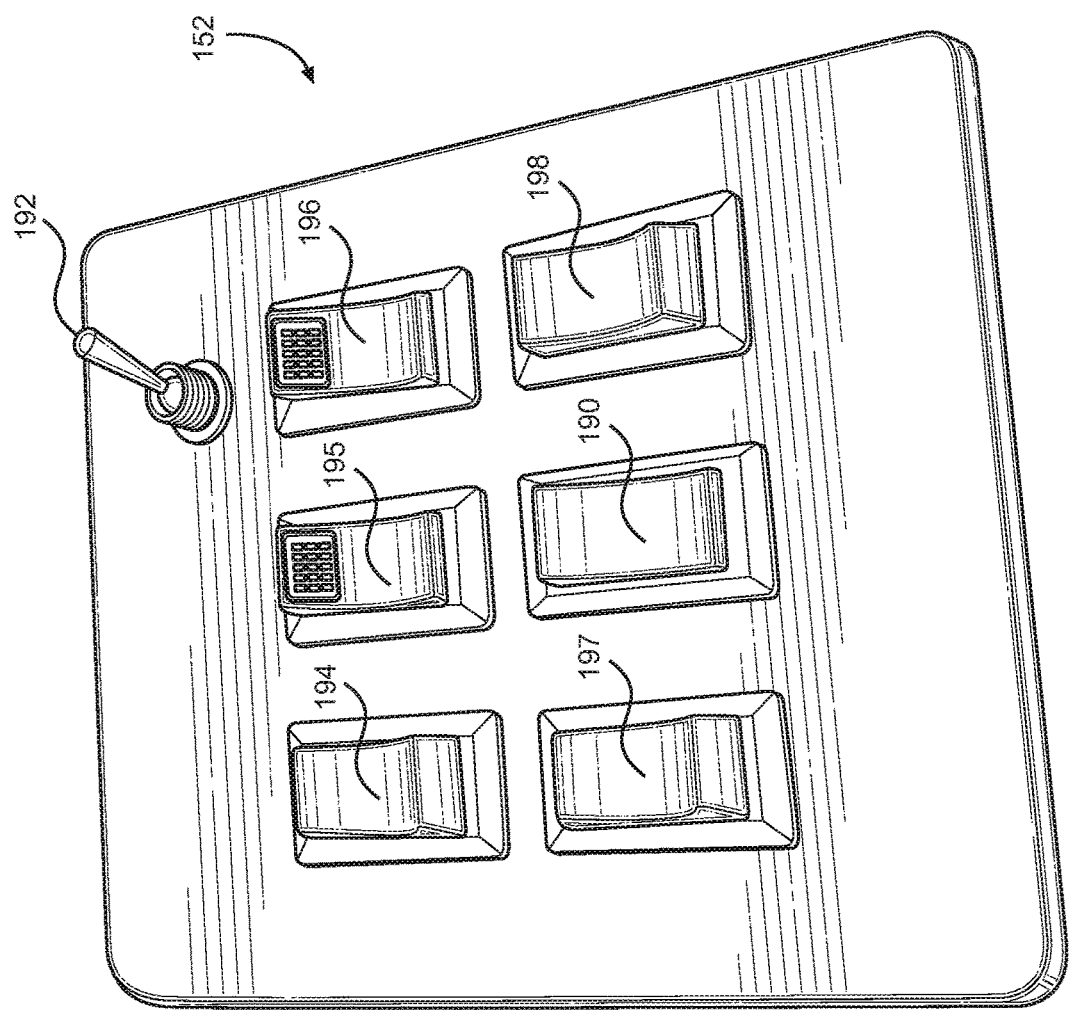
FIG. 12 is a top view of the internal hydraulic control panel located within the cab portion of the tractor truck.

Referring next to FIG. 12, the interior hydraulic control panel 152 has a series of controls necessary to enable the operator to utilize all hydraulic features of the tilt truck 10 from the driver's seat in the cab section 110 of the tilt truck 10. A master on switch 190 enables an operator to engage the hydraulic system of the tilt truck 10. An oil cooler controller 192 is provided in the interior hydraulic control panel 152 in order to enable the operator to turn on an oil cooler 188 integrated into the hydraulic system during protracted use of the hydraulic system raising and lowering vertical tanks 300. The interior hydraulic control panel includes a winch up and down control 194 enabling the operator to wind and unwind the winch cable 256 on the winch 250. A winch speed control 195 along with a clutch release 196 are also provided to enable the operator more precise control of the winch. A bed control switch 197 enables the operator to raise and lower the tilt platform 200 and a hook control switch 198 enables the operator to raise and lower the sliding arm assembly separately from tilt platform 200.

Figure 13:
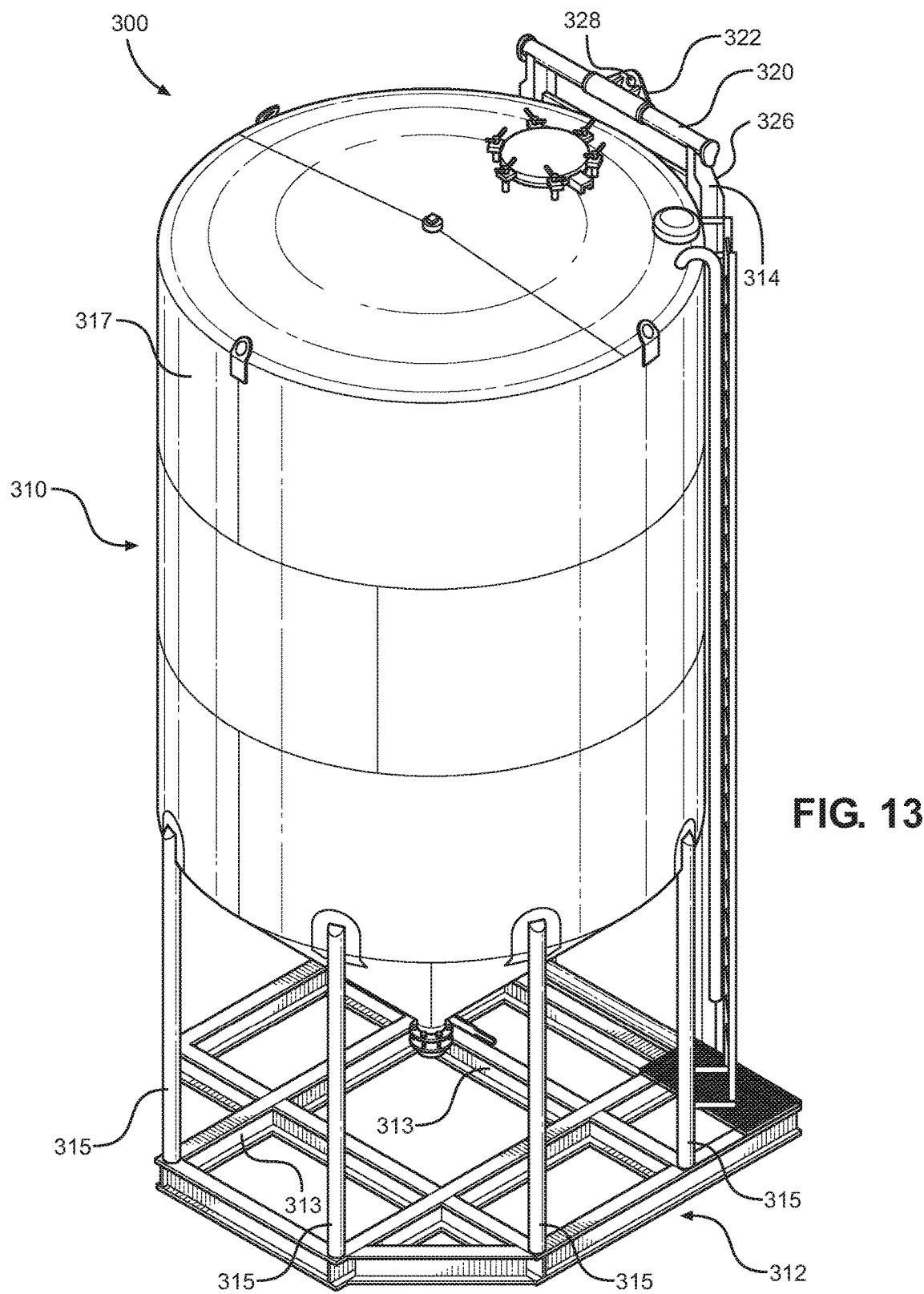
FIG. 13 is an isometric view of a vertical tank with a base frame and sled frame connected to and extending away from the base frame along the cylindrical section of the vertical tank with the sled frame terminating in a transverse top frame opposite the base frame.

Referring next to FIG. 13, a perspective view of the vertical tank 300 is shown. The tank 300 includes a large hollow body 310 for holding materials such as water, drilling mud, or drilling wastes. The tank 300 has a base frame 312 and a sled frame 314. For a vertical tank 300, the base frame 312 is located on the bottom of the tank 300 and the sled frame 314 runs along the cylindrical wall 317 of the tank 300, terminating in a tank lifting bar 320 opposite the base frame 312. The sled frame 314 is sized to slidably fit onto the left platform 220 and right platform 222 of the tilt platform 200. The sled frame 314 also includes a tapered section 326 adjacent the tank lifting bar 320.

In a preferred embodiment, the base frame 312 and sled frame 314 are made of steel members configured with I-beam cross sections 313. The I-beam cross sections 313 increase the structural rigidity of the base frame 312 to enable the base frame 312 to support the entire weight of the tank 300. The sled frame 314 is sufficiently rigid to serve as the primary structure support for the tank 300 when the tank 300 is tilted from a vertical position to a horizontal position and laid on the sled frame 314. Support members 315 are secured between the bottom of the cylindrical wall 317 and the base frame 312. The support members 315 hold the hollow body 310 in place above the base frame 312 and serve to further increase the structural rigidity of the base frame 312.

The tank lifting bar 320 holds a lifting line panel 322 that can rotate with respect to the tank lifting bar 320. A winch cable 256 from winch 250 may be connected to the lifting line panel 322 via a lifting line panel hole 328 on the lifting line panel 322 by any means known in the art.

Figure 14G:
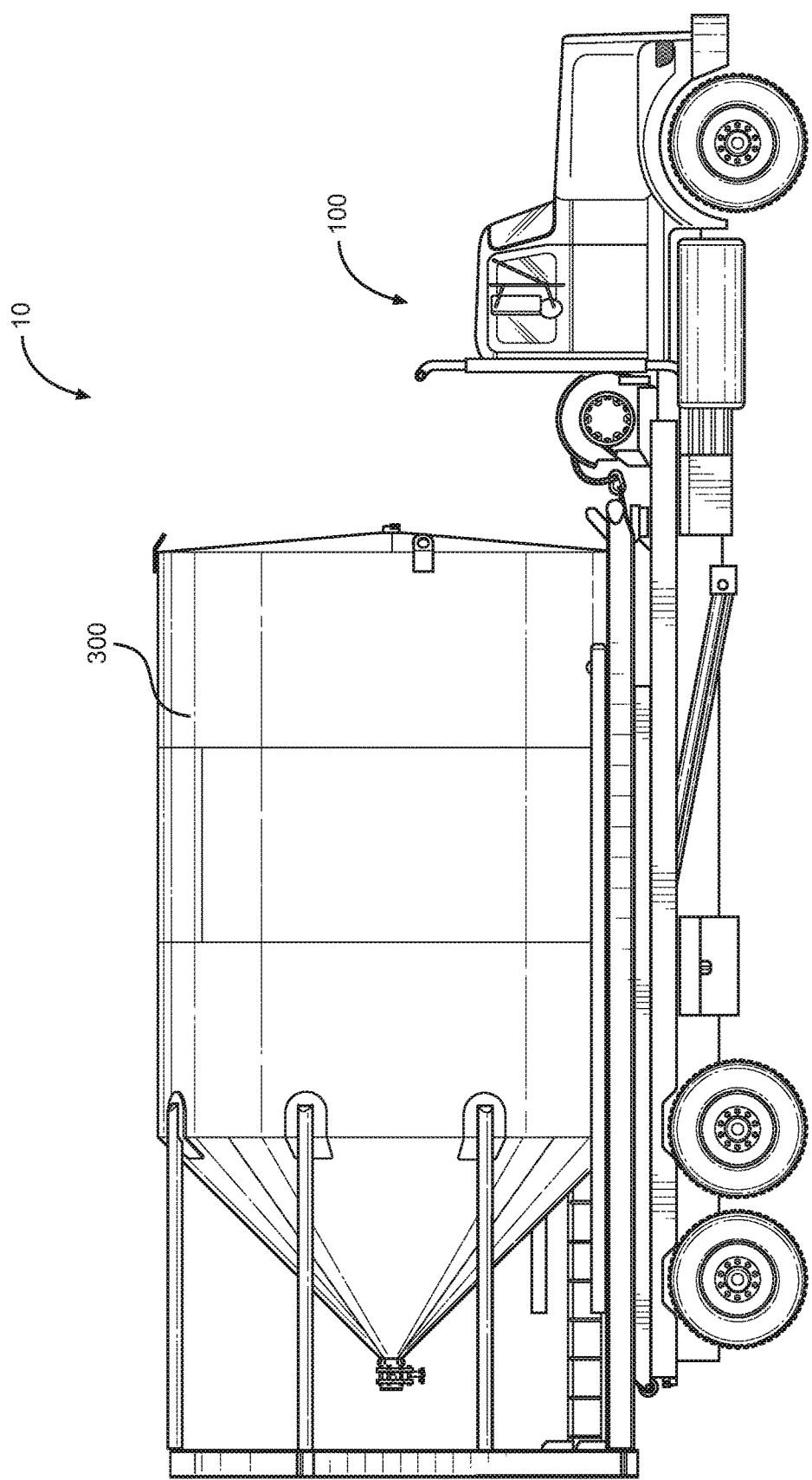
FIG. 14g is a right side view of the tilt truck showing the tilt platform in the down position with the tank securely attached to the tilt platform and ready for transportation.

Referring next to FIGS. 14a through 14g, a method of lowering a vertical tank 300 from a vertical position to a horizontal position utilizing the tilt truck 10 is disclosed. In FIG. 14a, the operator of the tilt truck 10 approaches the sled frame 314 of the vertical tank 300 with the tilt platform 200 in a substantially vertical position at engagement angle 500 with respect to the tractor truck 100 wherein the engagement angle is slightly more than 90 degrees.

As shown in FIG. 14b, as the tilt truck 10 approaches the sled frame 314 of the vertical tank 300, the operator utilizes the interior hydraulic control panel 152 to engage lower the sliding arm assembly 270 with respect to the tilt platform 200, in direction 502, until the left grappler hook 282 and the right grappler hook 284 are lower than the tank lifting bar 320.

As shown in FIG. 14c the operator continues to reverse the tilt truck 10 until the left grappler hook 282 and the right grappler hook 284 are located directly beneath the tank lifting bar 320. The operator then utilizes the interior hydraulic control panel 152 to raise the sliding arm assembly 270 with respect to the tilt platform 200, in direction 504, until the left grappler hook 282 and the right grappler hook 284 each contact the tank lifting bar 320. The operator continues to raise the sliding arm assembly 270 in direction 504 causing the tank lifting bar 320 to slide along the curved surface 285 of the left grappler hook 282 and the right grappler hook 284 until the tank base frame 312 is raised sufficiently off the ground to enable the tank 300 to rotate at the tank lifting bar 320 in the left grappler hook 282 and right grappler hook 284. As the tank 300 rotates at the tank lifting bar 320, the sled frame 314 rotates towards the left and right platforms 220 and 222 of the tilt platform 200.

To facilitate the rotation of the vertical tank 300 about the tank lifting bar 320 on the left and right grappler hooks 282 and 284, as shown in FIG. 14d, the operator next utilizes the interior hydraulic control panel 152 to lower the tilt platform 200 from the engagement angle 500 to the securing angle 506. The securing angle 506 is approximately 90 degrees between the tilt platform 200 and the tractor truck 100. At the securing angle 506, the tank 300 rotates in direction 507 about the tank lifting bar 320 until the sled frame 314 of the tank 300 directly contacts the left and right platforms 220 and 222 of the tilt platform 200.

As shown in FIGS. 14e and 14f, the operator next utilizes the interior hydraulic control panel 152 to lower the tilt platform 200 in direction 508 towards a horizontal position. Turning to FIG. 14g, the tilt platform 200 has been rotated to horizontal position with respect to the tractor truck 100 and the tank 300 is secured to the tilt truck 10 by way of the left grappler hook 282 and the right grappler hook 284 and is ready for transportation.

Each of the steps shown in 14a through 14g can be accomplished by a single operator of the tilt truck 10, while sitting in the cab section 110. However, it is to be appreciated that the exterior hydraulic control panel 150 is redundant to the interior hydraulic control panel 152. Accordingly, an operator of the tilt truck can utilize the hydraulic features of the tilt truck 10 utilizing the exterior hydraulic control panel 150 while a less experienced driver simply reverses the tilt truck 10 into the appropriate position.

It is to be appreciated by persons skilled in the art that the method disclosed in FIGS. 14a through 14g can be reversed in sequence thereby enabling a user to place a vertical tank stored securely in a horizontal position on a tilt truck 10 to a vertical position and ready for use. Utilizing such a process enables a single operator of a tilt truck 10 to deliver a vertical tank 300 to a particular site, and raise the vertical tank 300 to a vertical position, and place the vertical tank 300 in the desired position, all while never leaving the comfort of the cab section 110 of the tractor truck 100.

It is also to be appreciated that the novel features of the present invention also allow for placing a vertical tank 300 in a horizontal position directly onto the tilt truck 10 without use of a crane or other lifting device. FIGS. 15a through 15f generally show a method of placing a vertical tank 300 in a horizontal position on the ground directly onto the left platform 220 and the right platform 222 of the tilt platform 200 of the tilt truck 10.

Figure 15B:
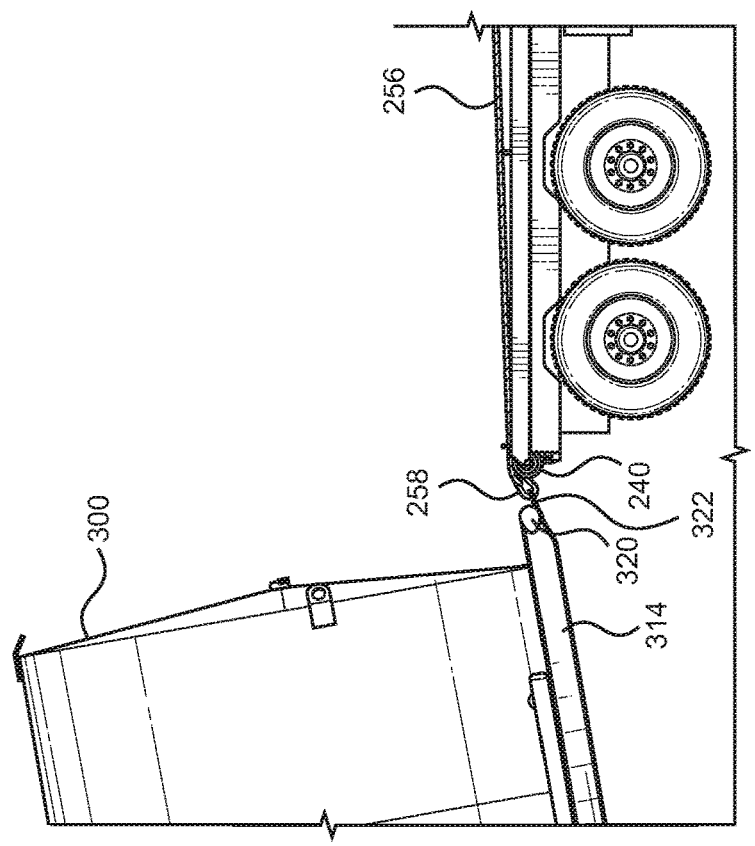
FIG. 15b is an isometric view of the tilt truck showing the vertical tank raised toward the rollers of tilt platform of the tilt truck.
Figure 15A:
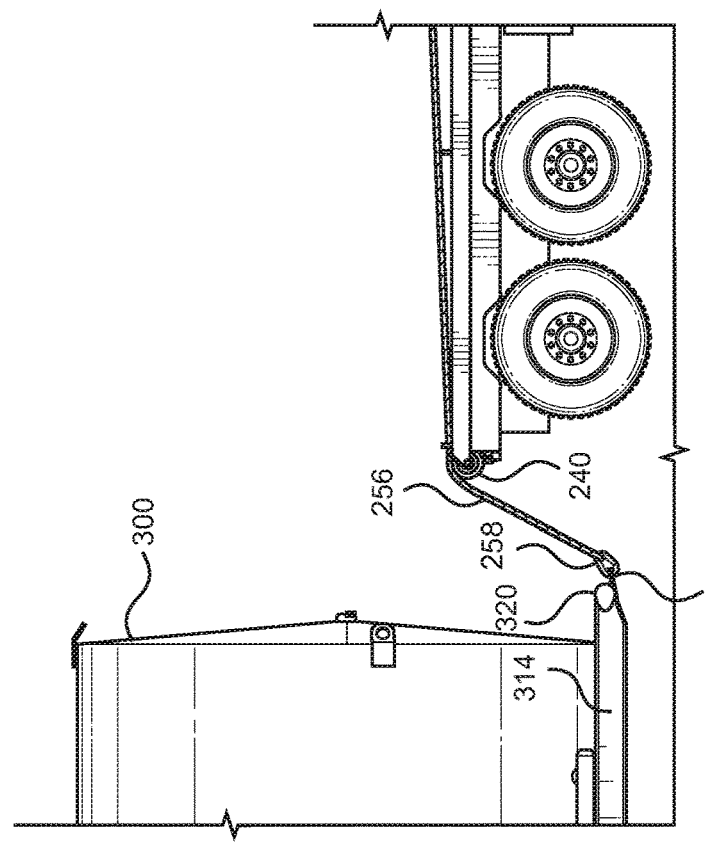
FIG. 15a is an isometric view of the tilt truck adjacent to a vertical tank resting in a horizontal position with the sled frame on the ground with the hook of the winch cable connected to the rotating top frame tab of the tank.

Turning to FIG. 15a, a vertical tank 300 is shown on the ground in a horizontal position such that the sled frame 314 is in contact with the ground. The operator of the tilt truck 10 backs the tilt truck 10 up such that the rear of the tilt truck 10 is adjacent the tank lifting bar 320 of the vertical tank 300. The operator unspools winch cable 256 from the winch 250 on the tilt platform 200 and connects a winch hook 258 to the lifting line panel 322 located on the tank lifting bar 320 of the vertical tank 300.

As shown in FIG. 15b, the operator next retracts the winch cable 256 by using the hydraulically powered winch 250. The winch cable 256 in turn then drags the vertical tank 300 towards the rollers 240 of the tilt platform 200. The lifting line panel d rotates with respect to the tank lifting bar 320 to ensure that the forces imparted by the winch cable 256 are distributed through the tank lifting bar 320.

Figure 15D:
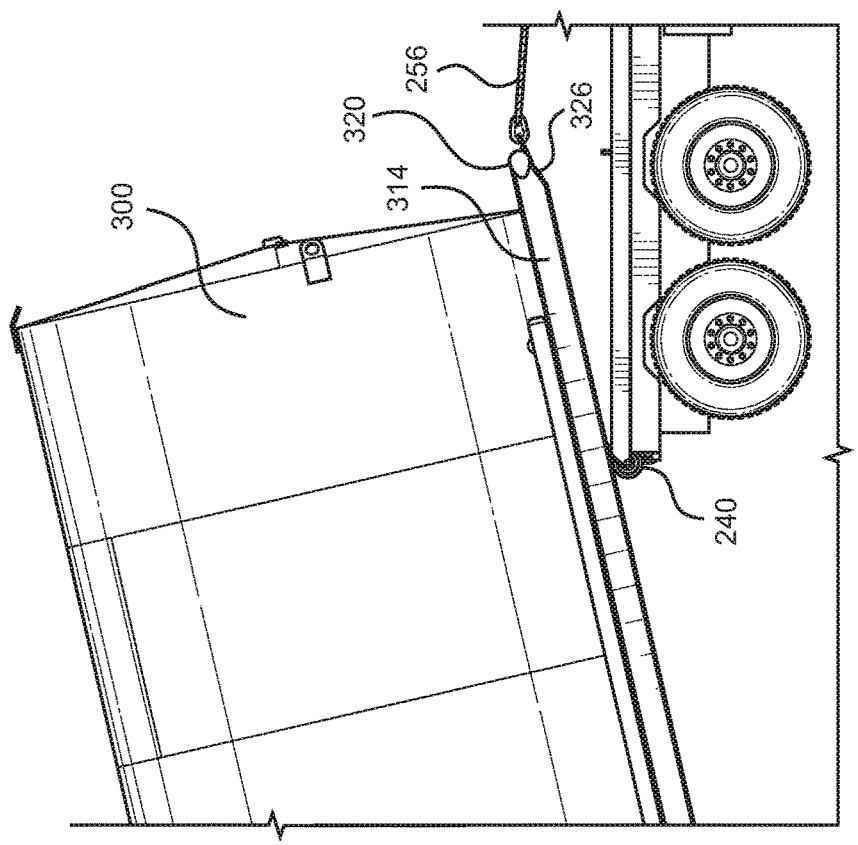
FIG. 15d is an isometric view of the tilt truck with the tilt platform rotated slightly from the down position to facilitate the rolling of the vertical tank on the platform.
Figure 15C:
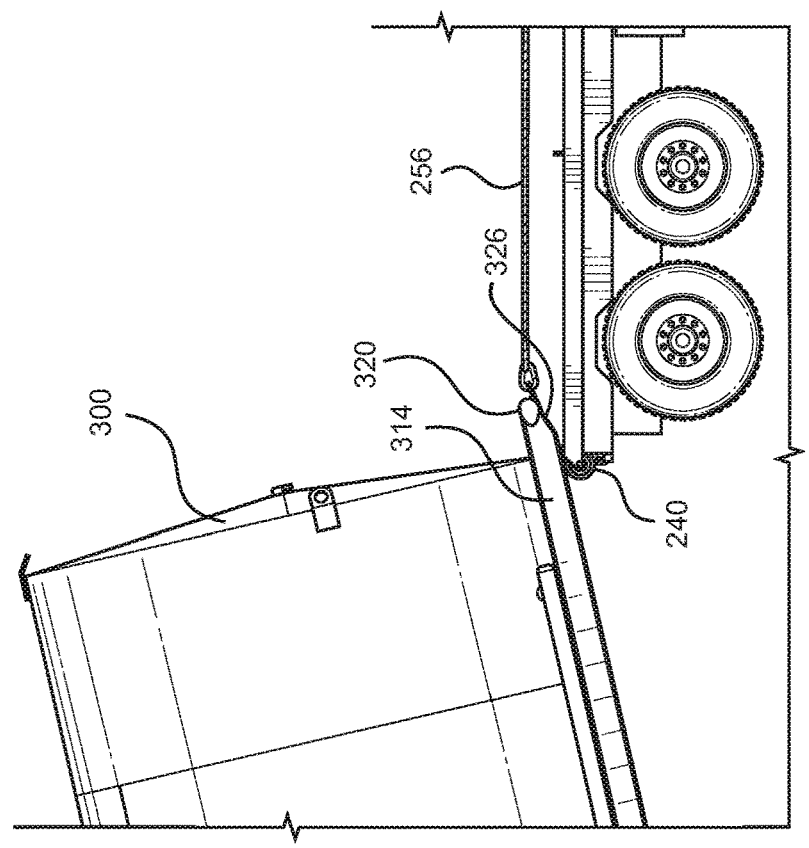
FIG. 15c is an isometric view of the tilt truck showing the winch pulling the sled frame of the vertical tank along the rollers of the tilt platform on the tilt truck.

As shown in FIG. 15c, the first point of contact between the vertical tank 300 and the rollers 240 is the tapered section 326 of the sled frame 314. The tapered section 326 ensures that the sled frame 314 will be properly placed on the rollers 240 as the winch cable 256 is further retracted by the winch 250.

As shown in FIG. 15d, the sled frame 314 passes over rollers 240 as the winch cable 256 is continually retracted until the center of gravity of the vertical tank 300 is passed over the rollers 240 at which point the sled frame 314 comes to rest on the left platform 220 and right platform 222 of the tilt platform 200 as can be seen in FIG. 15e. As the winch 250 finishes drawing the winch cable 256 into the winch 250, the vertical tank 300 is dragged along the sled frame 314 to a final transportation position on the tilt truck 10 with the winch cable 256 serving to secure the vertical tank 300 to the tilt platform 200 in lieu of the left grappler hook 282 and right grappler hook 284, as can be seen in FIG. 15f.

The process described in FIGS. 15a through 15f can be reserved in order to deliver the tank 300, with the operation of the tilt platform to deliver the vertical tank 300 in either a vertical or horizontal position. To deliver the tank 300 from the tilt platform 200 to a horizontal position utilizing the winch cable 256 and winch 250, the tilt platform 200 is sufficiently raised by the operator to enable gravity to draw the tank 300 off of the left and right platforms 202 and 204. The speed at which the tank 300 is lowered from the platforms 202 and 204 is controlled by the winch 250 and winch cable 256. Similarly, to deliver the tank 300 from the tilt platform 200 to a vertical position utilizing the winch cable 256 and winch 250 is nearly the same process, the only difference being raising the tank to a nearly vertical position until the edge of the base frame 312 of the tank 300 comes into contact with the ground, and then controlling the rate of rotation of the base frame 312 through use of the winch 250 and the winch cable 256.

Figure 16A:
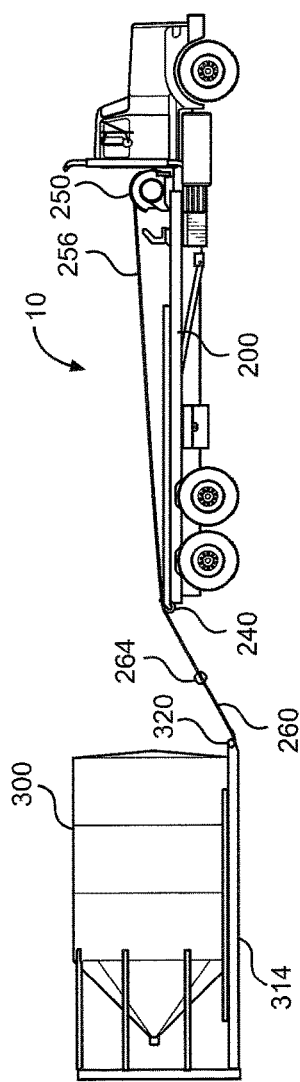
FIG. 16a is a side view of the tilt truck with the vertical tank resting on the ground in a horizontal position on its sled frame with a tank cable connected to the winch cable of the tilt truck.

Turning to FIGS. 16a through 16e, a method of raising a vertical tank 300 from a horizontal position on the ground to a vertical position utilizing the tilt truck 10 is disclosed. In FIG. 16a, the tilt truck 10 is oriented with its rollers 240 facing the tank lifting bar 320 of the vertical tank 300 with the vertical tank 300 oriented in a horizontal position with its sled frame 314 in contact with the ground. The winch cable 256 of the winch 250 is connected to a tank cable 260 connected by a connector 264 which in turn is connected to the tilt panel 262 on the tank lifting bar 320. The use of tank cable 260 allows for ease of disconnecting the winch cable 256 from the tank cable 260 after the tank 300 is lifted to a vertical position.

Figure 16B:
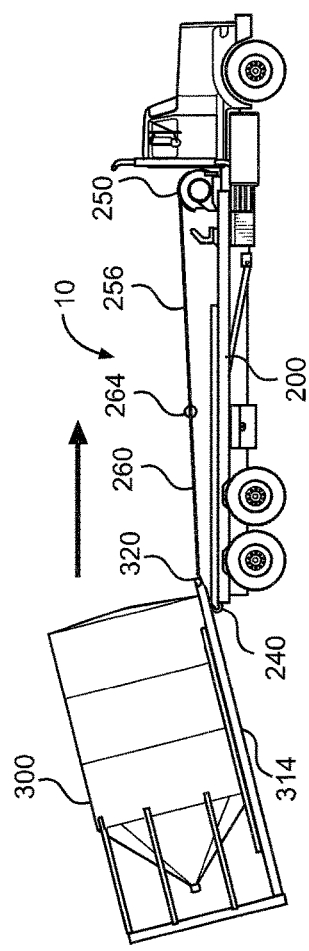
FIG. 16b is a side view of the tilt truck utilizing the winch and winch cable to draw the tank up from the ground such that the sled frame of the vertical tank is in contact with the rollers of the tilt truck.
Figure 16C:
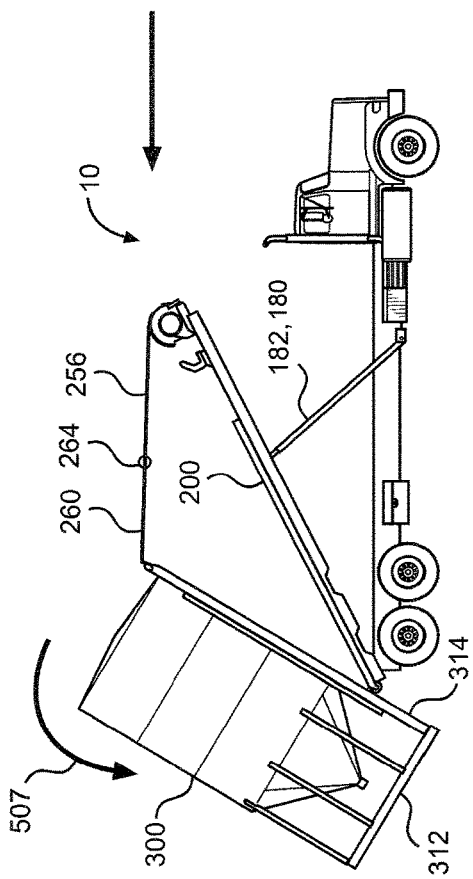
FIG. 16c is a side view of the tilt truck reversing towards the tank causing the rollers to roll along the sled frame of the tank with the tilt platform rotating to enable the user to control the rotation of the tank with the winch and winch cable.
Figure 16D:
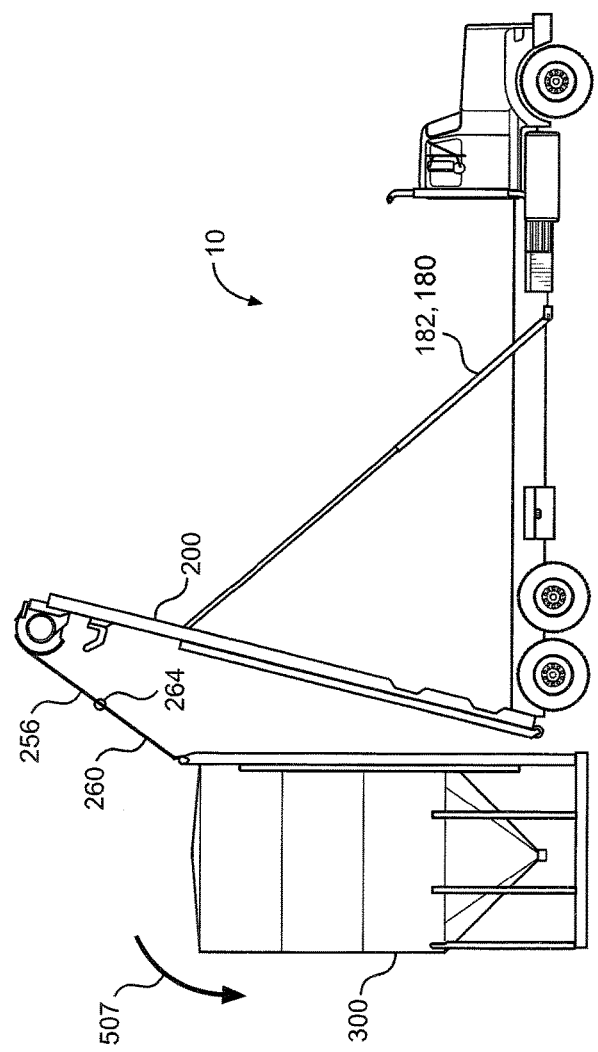
FIG. 16d is a side view of the tilt truck showing the vertical tank guided into a vertical position with its base frame on the ground through use of the winch cable and tilt platform.

In FIG. 16b, the operator retracts the winch cable 256 onto the winch 250 until the tank lifting bar 320 clears the rollers 240 and the rollers 240 are in contact with the sled frame 314 of the vertical tank 300. Next, as shown in FIG. 16c, the operator reverses the tilt truck 10 towards the tank 300 while raising the tilt platform 200. As the tilt truck 10 reverses towards the tank 300, the rollers 240 roll on the sled frame 314 of the tank 300 towards the base frame 312 of the tank 300. As the rollers 240 approach the base frame 312 of the tank 300, the tank 300 begins to rotate in direction 507. To ensure controlled rotation until the tank is in a vertical position, the tilt platform 200 is raised as can be seen in FIGS. 16c and 16d such that the tank cable 260 controls the rate of rotation 507 by the tank 300. The use of the tilt platform 200 in combination with the winch cable 256 ensures that gravity will not cause the tank 300 to rotate too quickly.

Figure 16E:
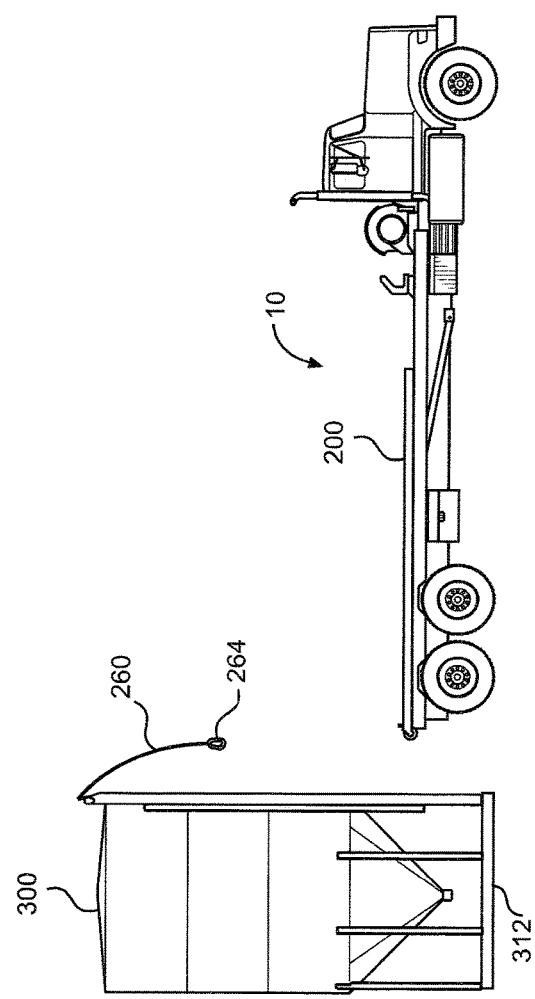
FIG. 16e is a side view of the tilt truck showing the vertical tank cable disconnected from the winch cable and the vertical tank ready for use.

As shown in FIG. 16e, once the tank 300 is securely resting on its base frame 312 in a vertical position, the tank cable 260 is disconnected from the winch cable 256 and the vertical tank 300 is ready for use. Connector 264 can be used in lieu of hook 258 (shown in FIG. 9).

Figure 17L:
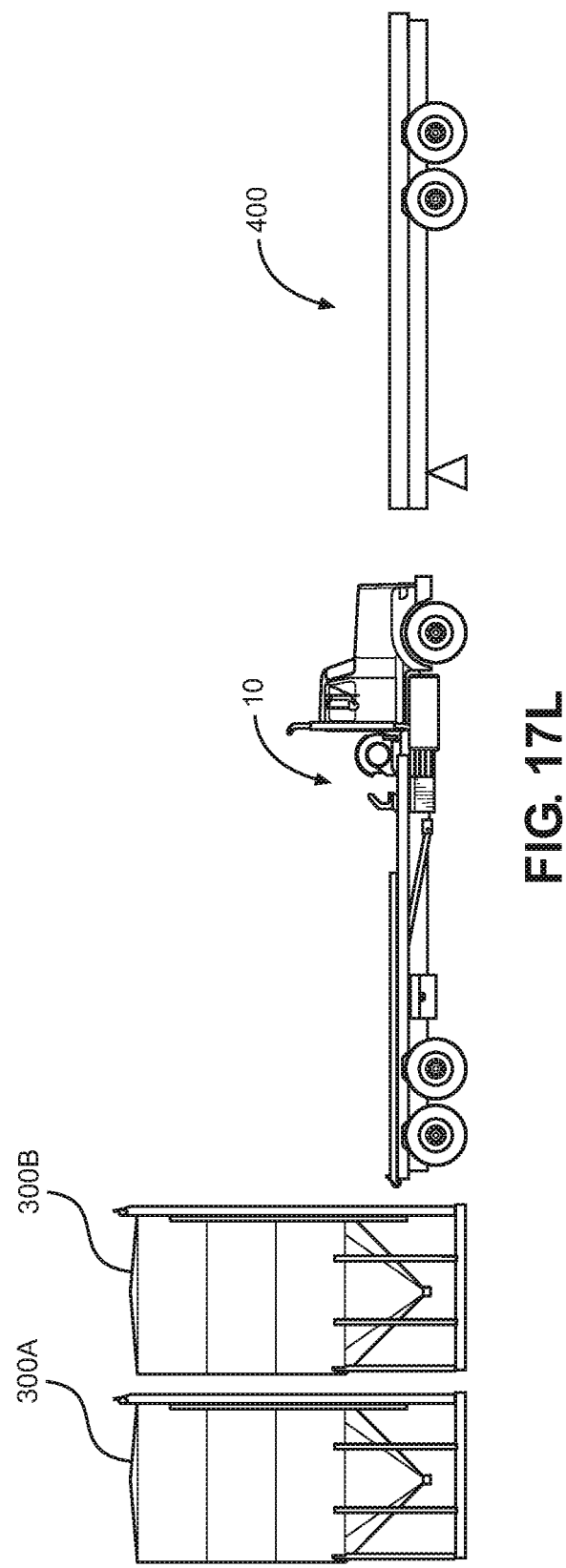
FIG. 17l is a side view of the tilt truck disconnected from the tank array and ready to reconnect to the trailer and leave the project site with the properly placed first and second vertical tanks in the tank array.

Turning to FIGS. 17a through 17l, a method of transporting a first vertical tank 300a and a second vertical tank 300b utilizing a trailer 400 in combination with the tilt truck 10. In FIG. 17a, the tilt truck 10 has a first vertical tank 300a in stored on the tilt platform 200 and is connected to a trailer 400 with a second vertical tank 300b stored on the trailer 400. As shown in FIG. 17b, first the operator must disconnect the trailer 400 in order to position the first vertical tank 300a in a vertical position according using the unique features of the tilt truck 10. Next, according to FIG. 17c, the operator uses the left main hydraulic arm 180 and right main hydraulic arm 182 to begin to lift the tilt platform 200 until the first vertical tank 300a and the tilt platform 200 are both approximately vertical. Once vertical, as can be seen in FIG. 17d, the operator lowers the sliding arm assembly 270 until the base frame 312 of the first vertical tank 300 rests on the ground. In FIG. 17e, the operator continues to lower the sliding arm assembly 270 until the left grappler hook 282 and the right grappler hook 284 are below the tank lifting bar 320 of the first vertical tank 300a thereby allowing the tilt truck 10 to freely move away from the first vertical tank 300a.

After position, the first vertical tank 300a in a vertical position in its proper place, as can be seen in FIG. 17f, the tilt truck 10 approaches the rear of the trailer 400 to have access to the tank cable 260 of the second vertical tank 300b. The winch cable 256 of the tilt truck 10 is connected to the tank cable 260 of the second vertical tank 300b in order to enable the operator to utilize the winch 250 of the tilt truck 10 to draw the second vertical tank 300b off of the trailer 400.

As shown in FIG. 17g, after the second vertical tank 300b is drawn off the trailer 400 by the winch 250, the operator continues to wind in the winch cable 256 until the sled frame 314 of the second vertical tank 300b is in contact with rollers 240. Then, as shown in FIG. 17h, the operator reverses the tilt truck 10 toward the second vertical tank 300b causing the rollers 240 to roll on the sled frame 314 of the second vertical tank 300b and rotating the second vertical tank 300b to a vertical positon. Simultaneously, the operator raises the tilt platform 200 to ensure that the winch 250 and winch cable 256 control the rotation of the second vertical tank 300b to a vertical position, as shown in FIG. 17i. Once the second vertical tank 300b is in a vertical position, it is raised off the ground by the winch 250 and winch cable 256 so as to enable the tilt truck 10 to move the second vertical tank 300b into a desired position as shown in FIG. 17j.

As shown in FIG. 17k, the tilt truck 10 used to move the second vertical tank 300b adjacent to the first vertical tank 300a. Often it is advantageous to locate one vertical tank adjacent to another for applications in the field, such as forming a tank array. The novel features of the tilt truck 10 enable the formation of a vertical tank array using the tilt tuck 10 as shown in FIG. 17l. The tilt truck 10 has completed the placement of the second vertical tank 300b in a vertical position thereby forming a tank array with first vertical tank 300a and second vertical tank 300b.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

While there have been shown what are presently considered to be preferred embodiments of the present invention, it will be apparent to those skilled in the art that various changes and modifications can be made herein without departing from the scope and spirit of the invention. Accordingly, the invention is not to be limited as except by the appended claims.

The invention claimed is:

1. A tilt truck comprising:
   a tractor truck comprising
      a cab section having an interior hydraulic control panel;
      a rear chassis frame section comprising
         a left chassis frame;
         a right chassis frame;
         a rear chassis frame connecting said left chassis frame to said right chassis frame;
         a platform mount connected to and extending away from said rear chassis frame;
         at least one main hydraulic arm connected to said rear chassis frame section wherein said at least one main hydraulic arm is controlled by said interior hydraulic control panel;
         a hydraulic system in fluid communication with said at least one main hydraulic arm;
   a tilt platform comprising
      a platform frame;
      a platform connected to a top of said platform frame;
      a sliding arm assembly slidably connected to said platform frame and having a least one grappler hook with a curved surface;
      a sliding hydraulic arm connected to said platform frame and said sliding arm assembly, in fluid communication with said hydraulic system of said tractor truck, and controllable by said interior hydraulic control panel;
      a slide frame with a left side and a right side and a plurality of slide pins connected to and extending away from said left side and said right side of said slide frame;
      a platform mounting bracket extending below said platform frame adjacent a rear of said platform frame;
      a main hydraulic arm mount sized to receive said an end of said at least one main hydraulic arm of said tractor truck; and
   wherein said tilt platform is rotatably connected to said tractor truck at said platform mounting bracket and said platform mount such that said tilt platform can rotate about said platform mount and wherein said at least one main hydraulic arm of said tractor truck is connected to said main hydraulic arm mount of said tilt platform.

2. The tilt truck of claim 1 further comprising one or more rollers rotatably connected to said rear of said platform frame.

3. The tilt truck of claim 2 further comprising a winch connected to said top of said platform frame adjacent a front of said tilt platform.

4. The tilt truck of claim 3 wherein said slide pins extend into a right slotted frame and a left slotted frame, wherein said right slotted frame and said left slotted frame are each connected to said platform frame between said platform of said tilt platform and said cab section of said tractor truck.

5. The tilt truck of claim 1 further comprising an exterior hydraulic control panel connected to said rear chassis section and in fluid communication with said hydraulic system and an auxiliary hydraulic reservoir connected to said rear chassis frame section and in fluid communication with said hydraulic system.

6. The tilt truck of claim 1 further comprising an oil cooler system in fluid communication with said hydraulic system and controllable at said interior control panel.

7. The tilt truck of claim 1 further comprising at least one storage container mounted to said rear chassis frame.

8. A method of transporting a vertical tank comprising the steps of:
   (a) providing a tilt truck comprising:
      a tractor truck comprising
         a cab section having an interior hydraulic control panel;
         a rear chassis frame section comprising
            a left chassis frame;
            a right chassis frame;
            a rear chassis frame connecting said left chassis frame to said right chassis frame;
            a platform mount connected to and extending away from said rear chassis frame;
            at least one main hydraulic arm connected to said rear chassis frame section wherein said at least one main hydraulic arm is controlled by said interior hydraulic control panel;
            a hydraulic system in fluid communication with said at least one main hydraulic arm;
      a tilt platform comprising
         a platform frame;
         a platform connected to a top of said platform frame;
         a sliding arm assembly slidably connected to said platform frame and having a least one grappler hook with a curved surface;
         a sliding hydraulic arm connected to said platform frame and said sliding arm assembly, in fluid communication with said hydraulic system of said tractor truck, and controllable by said interior hydraulic control panel;
         a platform mounting bracket extending below said platform frame adjacent a rear of said platform frame;
         a main hydraulic arm mount sized to receive said an end of said at least one main hydraulic arm of said tractor truck; and
      wherein said tilt platform is rotatably connected to said tractor truck at said platform mounting bracket and said platform mount such that said tilt platform can rotate about said platform mount and wherein said at least one main hydraulic arm of said tractor truck is connected to said main hydraulic arm mount of said tilt platform;
   (b) providing a vertical tank with a base frame and a sled frame wherein said sled frame is connected to said base frame and terminates opposite said base frame in a tank lifting bar;
   (c) raising said tilt platform to an engagement angle greater than 90 degrees with respect to said tractor truck
   (d) reversing said tilt truck until said at least one grappler hook is located directly underneath said tank lifting bar of said vertical tank;

(e) raising said sliding arm assembly until said at least one grappler hook contact said tank lifting bar;
(f) lifting said vertical tank about said tank lifting bar by further raising said at least one grappler hook until said vertical tank begins to rotate about said tank lifting bar;
(g) lowering said tilt platform to a securing angle of approximately 90 degrees with respect to said tractor truck thereby causing said sled frame of said vertical tank to come into contact with said platform; and
(h) lowing said tilt platform from said securing angle until said tilt platform rests on said rear chassis frame of said tractor truck resulting in a vertical tank stored in a horizontal position and secured on said platform by said at least one grappler hook.

9. The method of claim 8 wherein said tilt platform and said sliding arm assembly are controlled by said interior hydraulic control panel.

10. The method of claim 8 wherein said tilt truck further comprises a hitch.

11. The method of claim 10 further comprising attaching a trailer to said hitch of said tilt truck wherein said trailer stores a second vertical tank in a horizontal position.

12. A method of delivering two vertical tanks comprising the steps of:
(a) providing a tilt truck comprising:
a tractor truck comprising
a cab section having an interior hydraulic control panel;
a rear chassis frame section comprising
a left chassis frame;
a right chassis frame;
a rear chassis frame connecting said left chassis frame to said right chassis frame and having a hitch;
a platform mount connected to and extending away from said rear chassis frame;
at least one main hydraulic arm connected to said rear chassis frame section wherein said at least one main hydraulic arm is controlled by said interior hydraulic control panel;
a hydraulic system in fluid communication with said at least one main hydraulic arm;
a tilt platform comprising
a platform frame;
a platform connected to a top of said platform frame;
a sliding arm assembly slidably connected to said platform frame and having a least one grappler hook with a curved surface;
a sliding hydraulic arm connected to said platform frame and said sliding arm assembly, in fluid communication with said hydraulic system of said tractor truck, and controllable by said interior hydraulic control panel;
a platform mounting bracket extending below said platform frame adjacent a rear of said platform frame;
a main hydraulic arm mount sized to receive said an end of said at least one main hydraulic arm of said tractor truck; and
wherein said tilt platform is rotatably connected to said tractor truck at said platform mounting bracket and said platform mount such that said tilt platform can rotate about said platform mount and wherein said at least one main hydraulic arm of said tractor truck is connected to said main hydraulic arm mount of said tilt platform
(b) providing a first vertical tank with a base frame and a sled frame wherein said sled frame is connected to said base frame and terminates opposite said base frame in a tank lifting bar wherein said first vertical tank is stored in a horizontal position;
(c) providing a second vertical tank with a base frame and a sled frame wherein said sled frame is connected to said base frame and terminates opposite said base frame in a tank lifting bar;
(d) providing a trailer connected to said hitch of said tilt truck;
(e) storing said first vertical tank in a horizontal position on said tilt platform and securing said first vertical tank on said tilt platform through said sliding arm assembly;
(f) storing said second vertical tank in a horizontal position on said trailer; and
(g) using said tilt truck to transport said first vertical tank, said trailer, and said second vertical tank to a destination.

13. The method of claim 12 further comprising the steps of:
(h) disconnecting said trailer from said truck; and
(i) raising said vertical tank from said horizontal position to a vertical position using said tilt platform and said sliding arm assembly.

14. The method of claim 13 wherein said tilt platform further comprises a winch having a winch cable terminating in a winch hook.

15. The method of claim 14 further comprising the steps of:
(j) connecting said winch hook to said tank lifting bar of said second vertical tank and utilizing said winch to remove said second vertical tank from said trailer.

16. The method of claim 14 wherein said tilt truck further comprises one or more rollers rotatably connected to said rear of said platform frame of said tilt platform.

17. The method of claim 16 further comprising the steps of:
(k) utilizing said winch to drag said sled frame of said second vertical tank onto said one or more rollers;
(l) reversing said tilt truck towards said second vertical tank such that said one or more rollers rolls on said sled frame thereby raising said second vertical tank from said horizontal position to a vertical position.

18. The method of claim 17 further comprising the steps of:
(m) utilizing said winch to raise said vertical tank sufficiently off of a ground;
(n) utilizing said tilt truck to position said second vertical tank adjacent to said first vertical tank;
(o) utilizing said winch to lower said second vertical tank adjacent said first vertical tank thereby forming a tank array at said destination.

* * * * *